(12) United States Patent
Shiaku

(10) Patent No.: US 7,360,225 B2
(45) Date of Patent: Apr. 15, 2008

(54) DISC HOLDING MECHANISM

(75) Inventor: Tatsuo Shiaku, Saitama (JP)

(73) Assignee: TEAC Corporation, Tokyo (JP)

( * ) Notice: Subject to any disclaimer, the term of this patent is extended or adjusted under 35 U.S.C. 154(b) by 311 days.

(21) Appl. No.: 10/955,010

(22) Filed: Sep. 29, 2004

(65) Prior Publication Data

US 2005/0117947 A1 Jun. 2, 2005

(30) Foreign Application Priority Data

Sep. 30, 2003 (JP) .............................. 2003-341791

(51) Int. Cl.
*G11B 17/03* (2006.01)
(52) U.S. Cl. ..................................... 720/606
(58) Field of Classification Search ................. 720/606
See application file for complete search history.

(56) References Cited

U.S. PATENT DOCUMENTS

| | | | | |
|---|---|---|---|---|
| 5,291,465 A | * | 3/1994 | Dennis .................. | 369/30.85 |
| 5,897,153 A | * | 4/1999 | Philipps et al. .............. | 294/93 |
| 5,927,208 A | * | 7/1999 | Hagstrom et al. .......... | 101/486 |
| 6,222,800 B1 | | 4/2001 | Miller et al. ................. | 369/36 |
| 6,312,174 B1 | * | 11/2001 | Drynkin et al. ........ | 400/120.16 |
| 6,580,444 B1 | * | 6/2003 | Drynkin et al. ............. | 347/171 |
| 6,709,175 B1 | * | 3/2004 | Drynkin et al. .............. | 400/48 |
| 6,767,148 B2 | * | 7/2004 | Murata ...................... | 400/578 |
| 6,802,070 B2 | * | 10/2004 | Britz et al. ................. | 720/619 |
| 6,848,113 B2 | * | 1/2005 | Klein ......................... | 720/619 |
| 6,893,176 B2 | * | 5/2005 | Obara ....................... | 400/693 |
| 7,113,465 B2 | * | 9/2006 | Lee ............................ | 369/53.2 |
| 2002/0009022 A1 | | 1/2002 | Britz et al. ............... | 369/30.34 |

FOREIGN PATENT DOCUMENTS

| | | | |
|---|---|---|---|
| EP | 0768666 A2 | | 4/1997 |
| EP | 0849733 A1 | | 6/1998 |
| JP | 09326148 A | * | 12/1997 |
| JP | 10049958 A | * | 2/1998 |
| JP | 2002074793 A | * | 3/2002 |
| JP | 2002-260304 | | 9/2002 |
| JP | 2003248991 A | * | 9/2003 |

* cited by examiner

*Primary Examiner*—Angel Castro
*Assistant Examiner*—Christopher R. Magee
(74) *Attorney, Agent, or Firm*—Weingarten, Schurgin, Gagnebin & Lebovici LLP

(57) ABSTRACT

There is provided a disc holding mechanism capable of easily loading and unloading optical discs having different shapes on a disc tray, in which an optical disc is securely fixed and held on the disc tray and the load applied to the disc when it is loaded and unloaded on and from the disc tray can be eliminated. The disc holding mechanism is adapted to position and hold a disc on the surface of a disc tray 90 in place. The disc holding mechanism comprises a plurality of holding pins 57 and 58 that hold a central hole of the disc, in which at least one movable pin 59 of the holding pins controls a holding state of the disc. When loading the disc on the disc tray 90, the movable pin 59 presses the central hole of the disc in a centrifugal direction to secure the disc to be in its holding state. When unloading the disc, the movable pin 59 moves in a centripetal direction of the central hole to release the disc from its holding state.

2 Claims, 26 Drawing Sheets

(a)

(b)

(c)

(a)

(b)

(a)

(b)

DISC HOLDING MECHANISM

This application claims priority to a Japanese application No. 2003-341791 filed Sep. 30, 2003.

BACKGROUND OF THE INVENTION

1. Field of the Invention

The present invention relates to a disc holding mechanism for positioning and holding an optical disc such as a compact disc (CD) or a digital versatile disc (DVD) on the surface of a disc tray.

2. Description of the Related Art

Recently, as a recording medium such as a CD-R/RW or a DVD-R/RW/RAM are widely used, label printers that can print image or character information prepared by a computer on the label side of end-user compacts discs or digital versatile discs are increasing in demand.

Such label printers are generally classified into two types, i.e., a heat transfer type and an inkjet type. In both cases, basically, four colors of inks, i.e., magenta, yellow, cyan and black inks are used to print images on the label surface of optical discs.

In printing images on the label surfaces of optical discs, in order to position the optical discs in place and to prevent printing misalignment, an optical disc to be subjected to printing should be fixedly held on the surface of a disc tray. In label printers in production lines for manufacturing CDs or DVDs, surface-suction-type label printers having an excellent mass production capacity are generally used. However, a suction mechanism using a vacuum pump should be provided in such label printers, consequently enlarging the size of the printers, which are not suitable to be used as label printers for home. Further, label printers of the type for fixedly holding the outer circumferential edge of optical discs may be used. However, non-circular optical discs referred to as non-standard discs such as discs having shapes in imitation of characters or card type discs having the size of business name cards, are recently appearing. With the holding mechanisms of the surface suction type or the type that fixedly hold the external diameter part of optical discs, an attachment for fixedly holding a disc should be replaced with another attachment that correspond to the external shapes of optical discs to be subjected to printing, and the setting of the mechanism should be changed whenever the attachment is replaced. Thus, there is a problem in that the work efficiency typically decreases.

In order to solve the above problems, a positioning mechanism (for example, see Patent Document 1) is proposed, in which the positioning mechanism is fitted into a disc hole of an optical disc to be received in an received part provided in a disc tray and that pressed against an inner wall of the disc hole in the radial outward direction to position the optical disc.

FIG. 27 shows a printing tray 200 disclosed in Patent Document 1 exemplified above, a receiving recess 201 for receiving a disc for printing is formed in the main body of the tray. A positioning mechanism 202 is arranged at the center of the recess.

As shown in FIG. 27, the positioning mechanism 202 includes a frame body 203 that is fitted into the disc hole of the disc and fixing means 204 that presses the inner wall of the disc hole provided in the frame body 203 in the radial outward direction.

The fixing means 204 is provided with resilient members 205 (for example, a coil spring). One end of the resilient members 205 is fixed to a corresponding attachment surface 206 of the frame body 203 and the other end thereof is attached and fixed to a corresponding pushing piece 207. The resilient members 205 are radially provided on a plurality of attachment surfaces 206 equally distributed at the circumferential surface of the frame body 203. The resilient members 205 always bias the pushing pieces 207 provided in the respective resilient members 205 in the radial outward direction along the guide parts 208.

The optical disc received in the printing tray 200 are pressed and positioned in the radial outward direction by the pushing pieces 207 that are biased by the biasing force of resilient members 205.

[Patent Document 1] Japanese Unexamined Patent Application Publication No. 2002-260304

However, in the construction of the positioning mechanism proposed in Patent Document 1, throughout the different states of the printing tray, the inner wall of the disc hole is always in a state pressed by the positioning mechanism. Thus, when the optical disc on which label printing has been finished is removed from the printing tray, there is a problem in that load is applied to the inner diameter part of the disc to warp the optical disc and to affect the label surface on which printing has just been performed. In particular, the heat transfer type label printers require sufficient time until a transferred print image is fixed. Thus, there is a problem in that an image that has just been transferred frequently peels off due to the warpage of the optical disc and the optical disc slips.

Further, the label printers are often provided in an optical disc processing apparatus into which an auto-exchanger mechanism is assembled for automatic exchange of optical discs in consideration of the mass production capacity. However, the positioning mechanism proposed in Patent Document 1 is fixedly arranged at the center of a receiving recess of the printing tray and is always in a state fitted into the disc hole. Thus, there is a difficult of attaching or detaching an optical disc by means of machines. It is considered that the optical disc is attached or detached with the outer diameter part of the disc gripped. As described above, however, the positioning mechanism always presses the inner wall of the disc hole. Thus, there is a problem in that the load at the time of attaching or detaching the optical disc to or from the positioning mechanism is usually large and that it is difficult to cope with a non-circular optical disc.

Moreover, in order to prevent an erroneous operation of the label printer, there is a need to precisely determine whether or not any optical disc exists on the disc tray.

SUMMARY OF THE INVENTION

The present invention has been in consideration of the above-mentioned problems, and an object of the present invention is to provide a disc holding mechanism capable of automatically placing and removing an optical disc having different shapes on a disc tray, in which an optical disc is securely fixed and held on the disc tray and the load applied to the disc when it is placed and removed on and from the disc tray can be eliminated.

Thus, the present invention for overcoming the above problems by the respective means will be described below. Specifically, in a first aspect of the invention, there is provided a disc holding mechanism for positioning and holding a disc on a surface of a disc tray in place. The disc holding mechanism comprises a plurality of holding pins that hold a central hole of the disc, in which at least one movable pin of the holding pins controls a holding state of the disc, and, when loading the disc tray, the movable pin presses the central hole of the disc in a centrifugal direction, to secure the disc to be in its holding state, and when unloading the disc tray, the movable pin moves in a centripetal direction of the central hole to release the disc from its holding state. Further, in a second aspect of the invention, when unloading the disc tray, the movable pin moves in the centripetal direction of the central hole of the disc while it descends. Moreover, in a third aspect of the invention, whether the disc is placed or not is detected according to the position of the movable pin when the disc tray is loaded.

According to the first aspect of the invention, at least one of a plurality of holding pins that hold the central hole of a disc is used as a movable pin for controlling the holding state of the disc. When loading the disc tray, the movable pin presses the central hole of the disc in a centrifugal direction to secure the disc to be in its holding state, and when unloading the disc tray, the movable pin moves in a centripetal direction of the central hole to release the disc from its holding state. Thus, when the disc tray is unloaded, the holding pin does not press the central hole of the disc, so that the load applied to the disc when it is placed on and removed from the disc tray can be eliminated. Moreover, the holding pins except for the movable pin are fixed in place. Thus, the holding position of the disc with respect to the disc tray can be determined on the basis of a fixed point and the disc can always be held at the same position.

Further, according to the second aspect of the invention, when unloading the disc tray, the movable pin moves in the centripetal direction of the central hole of the disc while it descends. Thus, when unloading the disc tray, the portion of the central hole of the disc can be released and a damper for gripping the disc can be fitted into the central hole of the disc. Further, an inner diameter part of the central hole of the disc can be gripped. Thus, the automatic exchange of discs can be easily performed irrespective of the shapes of the discs.

Moreover, according to the third aspect of the invention, whether the disc is placed or not is detected according to the position of the movable pin when the disc tray is loaded. Thus, whether the disc is placed or not can be easily and correctly recognized simply by loading the disc tray. Further, the whether the disc is placed or not is detected in interlocking with the position of the movable pin. Thus, an additional detecting mechanism is not required, the efficiency of space can be improved, and the manufacturing cost of the apparatus can be lowered.

A disc holding mechanism comprises a plurality of holding pins that hold a central hole of a disc, in which at least one movable pin of the holding pins controls a holding state of the disc, and, when loading the disc on the disc tray, the movable pin presses the central hole of the disc in a centrifugal direction to secure the disc to be in its holding state, and when unloading the disc tray, the movable pin moves in a centripetal direction of the central hole to release the disc from its holding state. Further, when unloading the disc tray, the movable pin moves in the centrifugal direction of the central hole of the disc while it descends. Moreover, whether the disc is placed or not is detected according to the position of the movable pin when the disc tray is loaded.

DESCRIPTION OF THE PREFERRED EMBODIMENT

One embodiment of the present invention will be described with reference to FIG. 1 to FIG. 22.

Figure 1:
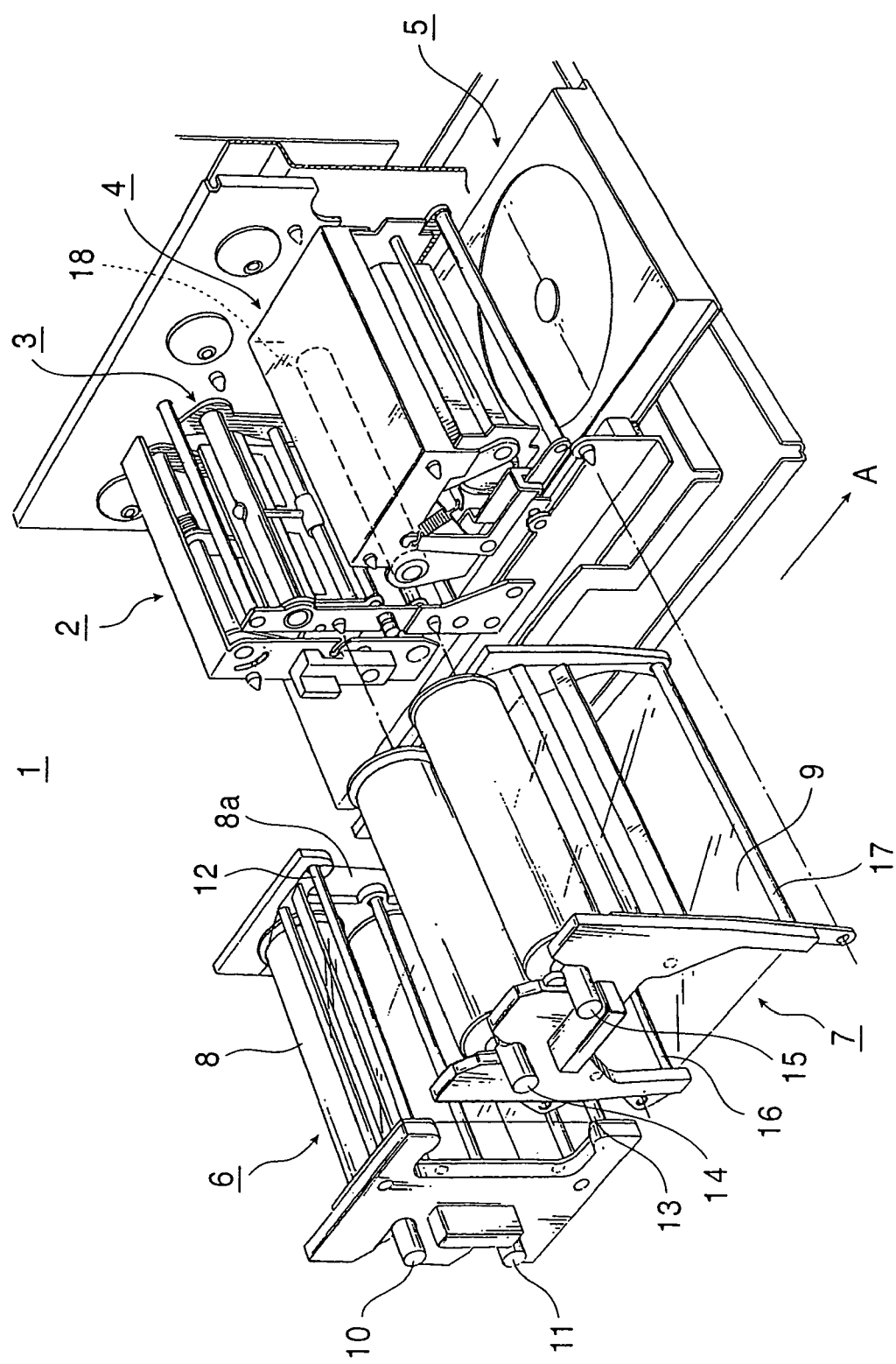
FIG. 1 is a perspective view showing the construction of essential parts of a label printer.
Figure 2:
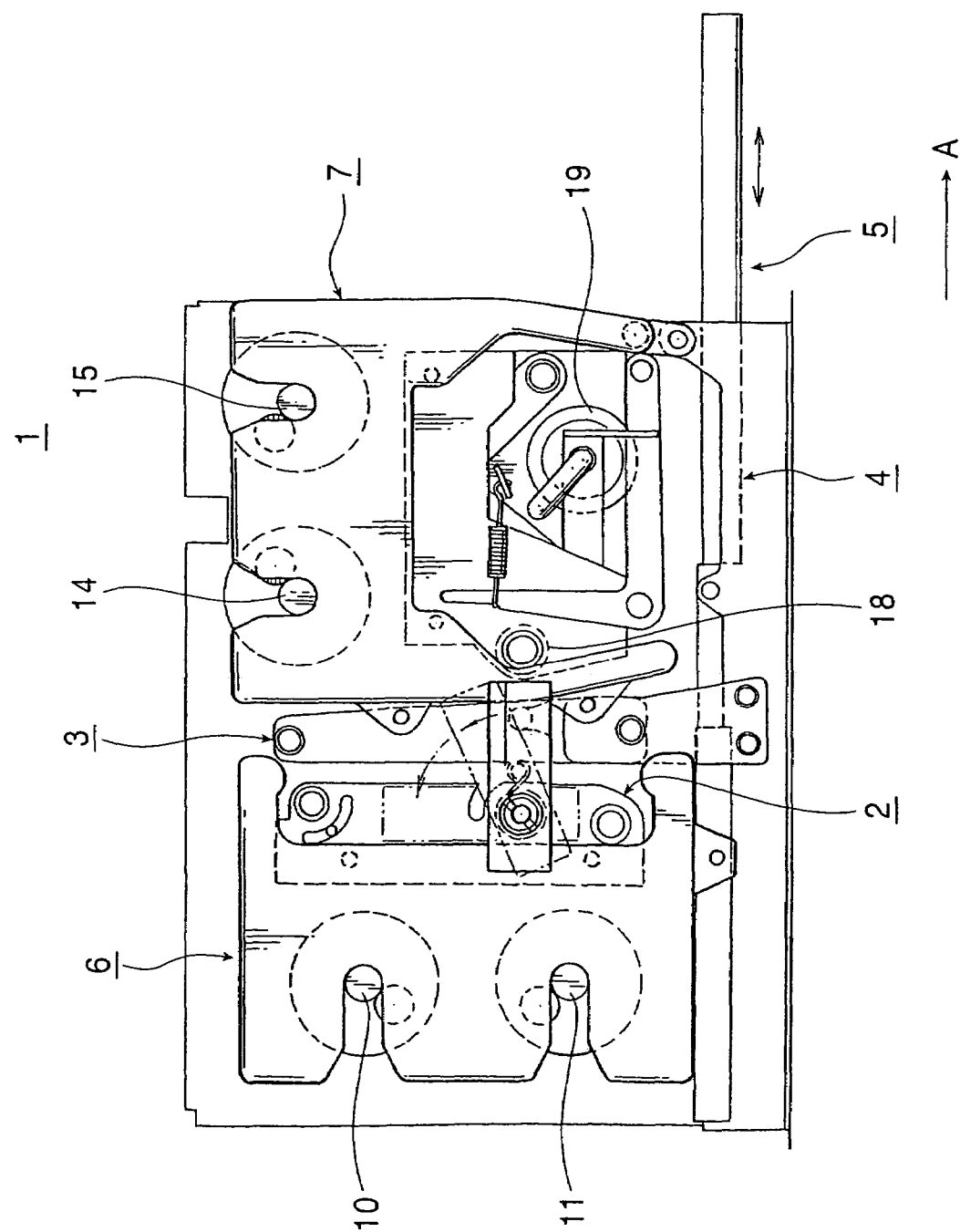
FIG. 2 is a side view showing the construction of the essential parts of the label printer.

Schematic diagrams of a label printer to which the present invention is applied are shown in FIG. 1 and FIG. 2. FIG. 1 is a perspective of the label printer, and FIG. 2 is a side view of the label printer. The label printer 1 generally comprises a head unit 2, a guide unit 3, a transfer roller unit 4, a disc carrying unit 5, an ink ribbon cassette 6, and a heat transfer film ribbon cassette 7. The ink ribbon cassette 6 and the heat transfer film ribbon cassette 7 are attachable to or detachable from the side of the label printer. The ink ribbon cassette 6 is set such that an exposure surface 8a of an ink ribbon 8 is located between the head unit 2 and the guide unit 3. The heat transfer film ribbon cassette 7 is set such that the heat transfer film ribbon 9 is wound against the heat transfer roller unit 4.

The ink ribbon cassette 6 has a feed roller 10 and a take-up roller 11. The ink ribbon 8 is wound around the feed roller 10 and the take-up roller 11 therebetween via guide rollers 12 and 13. The ink ribbon 8 is coated with inks so that black, cyan, magenta, and yellow inks are repeated in this order.

The heat transfer film ribbon cassette 7 has a feed roller 14 and a take-up roller 15. The heat transfer film ribbon 9 is wound around the feed roller 14 and the take-up roller 15 therebetween via guide rollers 16 and 17.

The head unit 2 has a thermal printer head (not shown) for transferring respective inks coated on the ink ribbon 8 to the heat transfer film ribbon 9. The head unit causes the thermal printer head to move in the direction of "A" in the drawings from the space that is secured in the guide unit 3, and to abut on a platen roller 18 of the heat transfer film ribbon 4. In this case, since the ink ribbon 8 and the heat transfer film ribbon 9 is sandwiched between the thermal printer head and the platen roller 18, the ink ribbon 8 and the heat transfer film ribbon 9 simultaneously moves to control the thermal printer head, whereby an image is transferred to the heat transfer film ribbon 9. Since a color image (transferred to the heat transfer film) is made by overlapping the respective inks, four transfer operations are repeated on one color image.

The guide unit 3 has a function to wind the ink ribbon 8 and the heat transfer film ribbon 9 against the platen roller 18 in the shape of "M". The guide unit 3 causes a pair of pinch rollers (not shown) to move in the direction of "A" in the drawings, thereby winding the ink ribbon 8 and the heat transfer film ribbon 9 against the platen roller 18 while guiding the ink ribbon 8 and the heat transfer film ribbon 9.

The transfer roller unit 4 has the aforementioned platen roller 18 and a heating roller 19. The heating roller 19 is supported so as to ascend or descend. An image transferred to the heat transfer film ribbon 9 by the thermal printer head, moves to its transfer position at which the image is transferred to an optical disc that is placed on a later-described disc tray unit of the disc carrying unit 5 below the heating roller 19. Meanwhile, the disc tray unit having the optical disc placed thereon is temporarily pulled into the label printer. When the disc tray unit moves to its ejected position (direction "A" in the drawings), the heating roller 19 is caused to ascend and the heat transfer ribbon 9 is caused to press against the optical disc on the disc tray unit. Thereby, the image formed on the heat transfer film ribbon 9 is transferred to the optical disc.

Next, the construction of the disc carrying unit 5 of the present invention will be described below.

The disc carrying unit 5 mainly comprises a disc tray unit, a disc tray unit carrying mechanism, and a disc holding unit.

Figure 3:
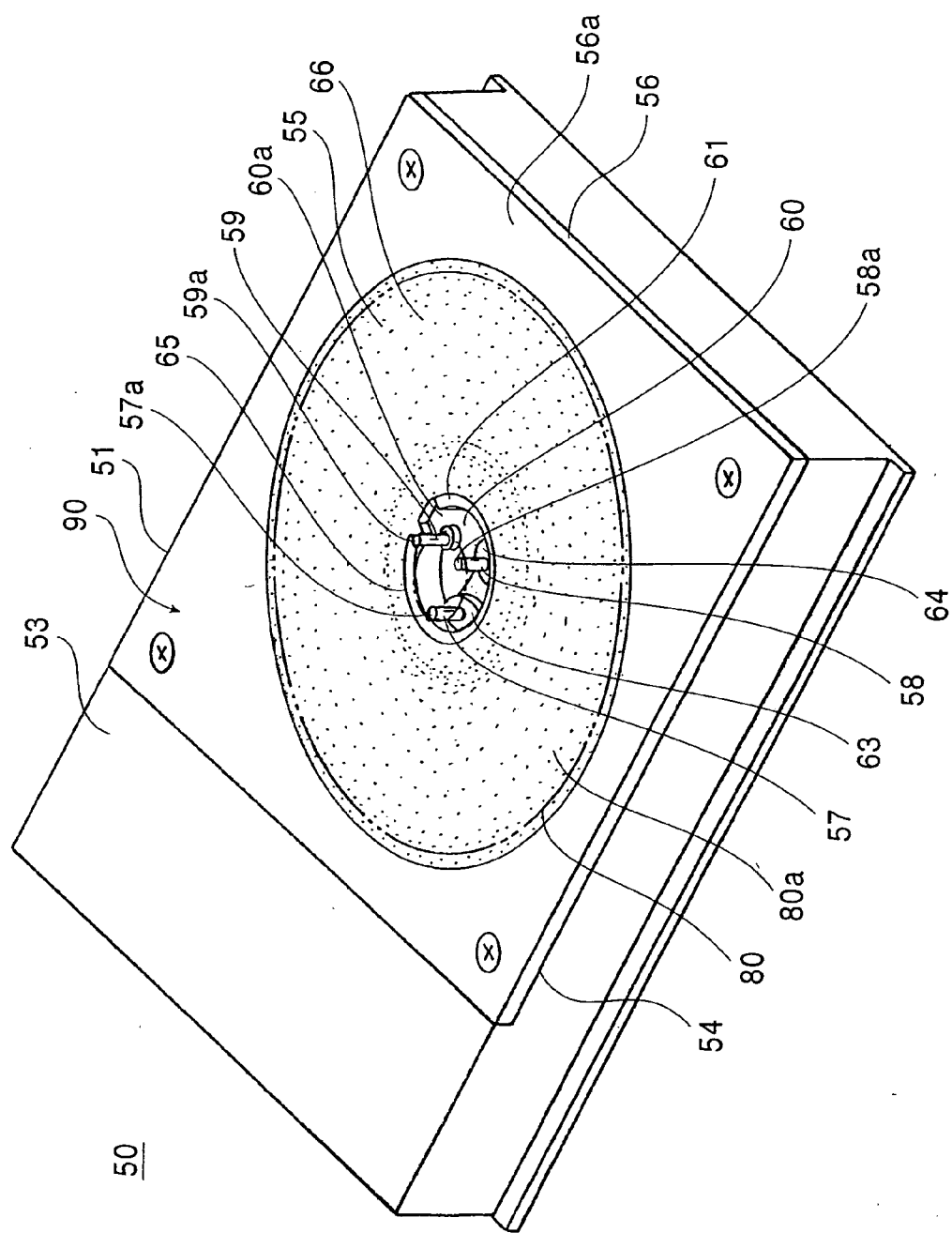
FIG. 3 is an external view of a disc tray unit.

FIG. 3 is an external view of the disc tray unit.

The disc tray unit 50 includes a frame body 51 in which a top plate and side plates are integrally with each other, a bottom plate 52 that blocks the bottom surface of the frame body 51, and a disc holding mechanism that is provided within the frame body 51.

Two flat faces 53 and 54 having different heights are formed on the upper face of the top plate of the frame body 51. To the lower-stage flat surface 54 is attached an adapter 56 on which a disc placing part 55 is formed to have a shape matched to the shape of the optical disc to be subjected to printing. The adapter 56 is removable, and exchangeable in accordance with the shape of the optical device to be subjected to printing.

Substantially at the center of the lower-stage flat surface 54 of the frame body 51, holding pins 57, 58 and 59 protrudes to fixedly hold a later-described optical disc that is provided in the disc holding mechanism, and a substantially circular clamping hole 60 is bored into which a clamping head of a later-described clamper is fitted. At the periphery of the clamping hole, a fitting wall 61 is molded to protrude in a substantially circular shape to position the adapter 56. At a position corresponding to the holding pin 59 of the clamping hole 60, a recess 60a is formed from the center of the clamping hole 60 toward the centrifugal direction and, as described later, is formed to be capable of being entered by the holding pin 59. Also, two protrusions 63 and 64 are formed in the clamping hole 60 from the lower face of the top plate of the frame body 51 toward substantially the center of the clamping hole 60. At the respective protrusions 63 and 64, holding pins 57 and 58 are erected in a direction protruding from the surface of the disc placing part 55 so as to fixedly hold the optical disc placed on the disc placing part 55 and to perform positioning of the optical disc. Moreover, since the holding pins 57 and 58 is fixed in place, the holding pins 57 and 58 are referred to as stationary pins 57 and 58 in the following description, and are distinguished from later-described movable pin 59.

In the disc placing part 55 formed in the adapter 56, a fitting part 65 is bored at a position corresponding the clamping hole 60 bored in the lower-stage flat surface 54 of the frame body so as to have substantially the same size as the external diameter of the fitting wall 61. A doughnut-shaped sheet 66 is adhered to the disc placing part 55 for preventing the optical disc from slipping. Moreover, a disc surface, an adapter surface 56a, and apexes 57a, 58a and 59a of the respective holding pins when the optical disc is placed on the disc placing part 55 are designed to flush with the upper-stage flat surface 53 of the frame body.

Figure 4:
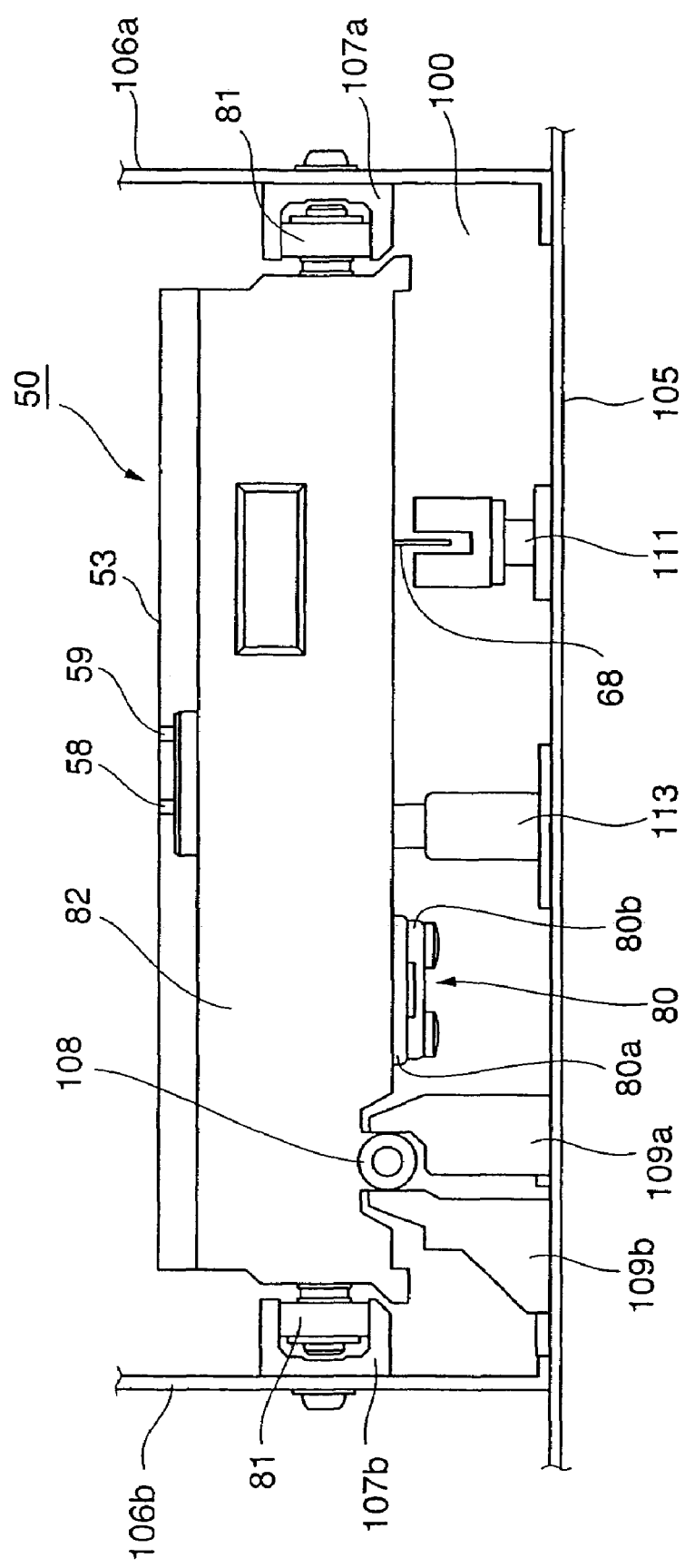
FIG. 4 is a front view showing the construction of essential parts of a disc tray unit carrying mechanism.
Figure 5:
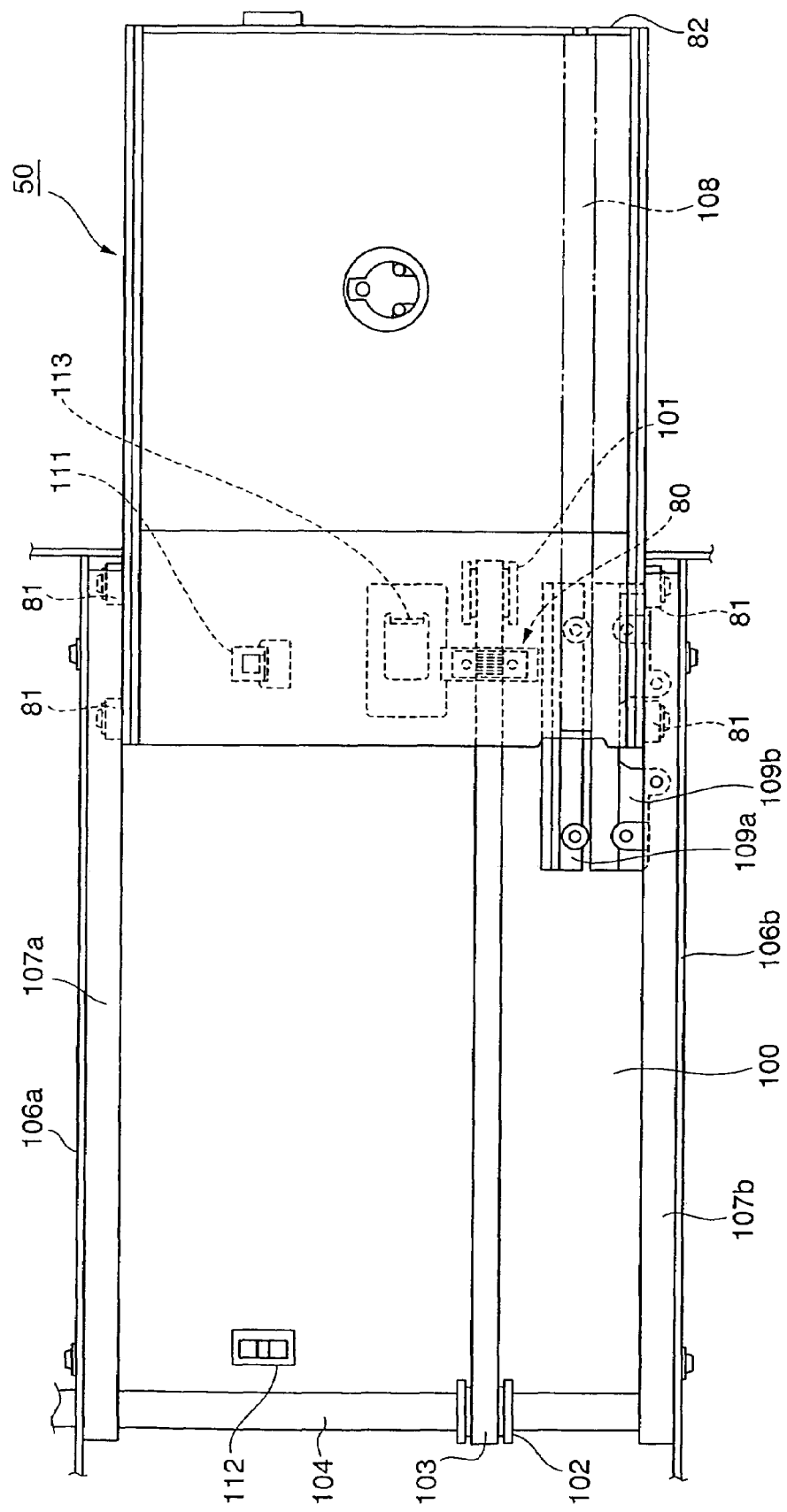
FIG. 5 is a top plan view showing the construction of the essential parts of the disc tray unit carrying mechanism.

Next, the disc tray unit carrying mechanism will be described in detail. FIGS. 4 to 8 show the construction of essential parts of the disc tray unit carrying mechanism wherein FIG. 4 is a front view, FIG. 5 is a top plan view, FIG. 7 is a side view, FIG. 8 is a lower perspective view, and FIG. 8 is a back view of the frame body.

The disc tray unit 50 is reciprocated by means of a driving mechanism that is provided in the main body of the label printer that receives the disc tray unit 50.

In the present embodiment, the disc tray unit 50 is configured to move by belt driving. Since the movement of the disc tray unit by the belt driving has a characteristic that a vibrational component is hardly transmitted to the disc tray unit as compared to the movement of a disc tray unit by a rack and a pinion, it is suitable for a driving mechanism that is employed in a device in which the control of a vibrational component is considered to be important as in a disc tray unit in a label printer.

Wheels 101 and 102 are respectively arranged at the front and rear ends of a disc tray unit receiving part 100. A timing belt 103 is provided in a tensioned state between the two wheels 101 and 102. The wheel 102 is journalled to the driving shaft 104. A driving motor (not shown) rotates the wheel 102 along with the driving shaft 104, whereby a driving force is transmitted to the timing belt 103. A timing belt locking part 80 is provided on the lower face of the disc tray unit 50. The timing belt 103 is sandwiched and fixed in place by a fixing member 80*b* whose contact surface between a base 80*a* formed in the frame body 51 and the timing belt 103 is subjected to anti-slip processing, whereby the disc tray unit 50 moves with the driving of the timing belt 103.

Four guide rollers 81 are journalled to the lateral surface of the disc tray unit 50 on the rear side thereof. These guide rollers are fitted to U-shaped guide rails 107*a* and 107*b* that are fixed with screws to the inner surfaces of sub-chassis 106*a* and 106*b* that are erected from the inner surface of a chassis 105 of the disc tray receiving part 100. Further, on one side of the bottom surface of the disc tray unit, a guide shaft 108 is installed in the direction in which the disc tray unit 50 moves. The guide shaft 108 engages with a pair of guide member 109*a* and 109*b* arranged at the front of the disc receiving part 100 on one side thereof, whereby the movement of the disc tray unit 50 is guided. Moreover, both ends of the guide shaft 108 are protrudingly formed. The guide shaft 108 is fixed to the frame body 51 by fitting one protruding end into an engaging hole 83 that is bored in a frame body front face 82 of the disc tray unit 50 and by fitting the other protruding end into an engaging hole 110*a* that is bored in a guide shaft fixing member 110 fixed to the frame body 51.

At the front and rear ends of the disc tray unit receiving part 100, positioning sensor 111 and 112 are arranged at positions substantially corresponding to the wheels 101 and 102. The positioning sensors 111 and 112 detect a detecting member 68 vertically provided from the disc tray unit 50, thereby controlling the range of movement of the disc tray unit 50.

Next, the disc holding mechanism will be described with reference to FIGS. 9 to 21.

In the following description, the upper face of the top plate of the frame body 51 to which the adapter 56 formed with the disc placing part 55 is attached will be referred to as a disc tray 90.

Figure 9:
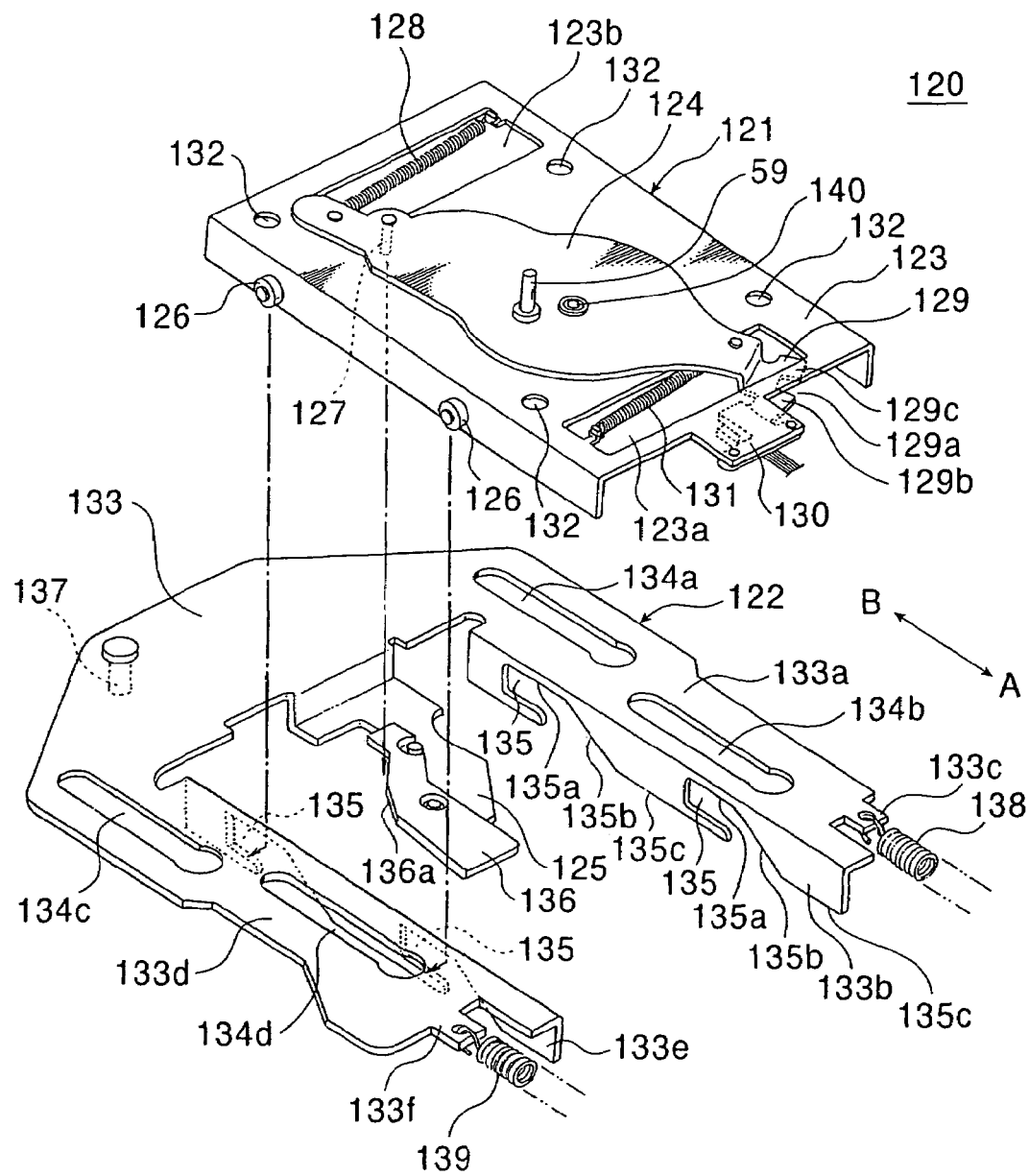
FIG. 9 is a perspective view for explaining the construction of a disc holding mechanism.

As shown in FIG. 9, a disc holding mechanism 120 generally comprises a pressing mechanism 121 for pressing a central hole 70*a* of an optical disc 70 placed on the disc tray in the centrifugal direction to fixedly hold an optical disc 70, and an elevating mechanism 122 for elevating the pressing mechanism in accordance with the movement of the disc tray unit 50.

The pressing mechanism 121 mainly includes an elevating plate 123, and a rotatable arm 124 rotatably attached to the elevating plate 123, and a rotating cam 125 formed in a later-described slide plate 133 for rotating the rotatable arm 124.

The elevating plate 123 is formed substantially in the shape of "U". At the front and rear ends of a ceiling surface of the elevating plate 123, elongate holes (having a rectangular shape) 123*a* and 123*b* are bored to provide tension coil springs 128 and 131 between the elevating plate 123 and the rotatable arm 124. A guide roller 126 is journalled to the lateral surface of the elevating plate 123.

The rotatable arm 124 is journalled to a rotating shaft 140 whose center is located substantially at the center of the ceiling surface of the elevating plate. At one end of the rotatable arm 124 is vertically provided a guide pin 123, which passes through the second elongate hole 123*b*. The one end of the rotatable arm 124 is always biased in the clockwise direction by the tension coil spring 128 that is provided in a tensioned state between the elevating plate 123 and the rotatable arm 124 in the second elongate hole 123*b*. On the other hand, the other end of the rotatable arm 124 is bent in the shape of a crank and is located below the elevating plate 123 through the first elongate hole 123*a*. The tip of the end of the rotatable arm 124 is formed in the shape of the letter "T". Substantially at the center of the T-shaped part 129 in its transverse direction is provided a cutout 129*a* on both sides of which first and second tongue pieces 129*b* and 129*c* are formed. On the lower face of the elevating plate 123, a photosensor 130 for detecting a rotational position of the rotatable arm 124 is arranged at a position corresponding to a rocking position of the T-shaped part 129 formed in the rotatable arm 124. Further, the other end of the rotatable arm 124 is always biased in the clockwise direction by the tension coil spring 131 that is provided in a tensioned state between the elevating plate 123 and the rotatable arm 124 in the first elongate hole 123*a*.

Around the axis of rotation of the rotatable arm 124, a holding pin 129 for fixedly holding an optical disc placed on the disc tray 90 is erected in the direction protruding from the surface of the disc tray 90. The holding pin 59 moves in the centrifugal direction of the central hole 70*a* of the optical disc along with rotation of the rotatable arm 124 to fixedly hold or release the optical disc. Moreover, since the holding pin 59 functions as a movable pin that controls a holding state of the optical disc, the holding pin 59 is referred to as a movable pin in the following description, and is distinguished from the stationary pins 57 and 58.

The guide pin 127 vertically provided at one end of the rotatable arm 124 abuts on the rotating cam 125 formed in a later-described slide plate 122, and is guided in the rotating cam 125 to cause the rotatable arm 124 to rotate in the counterclockwise direction.

Figure 10:
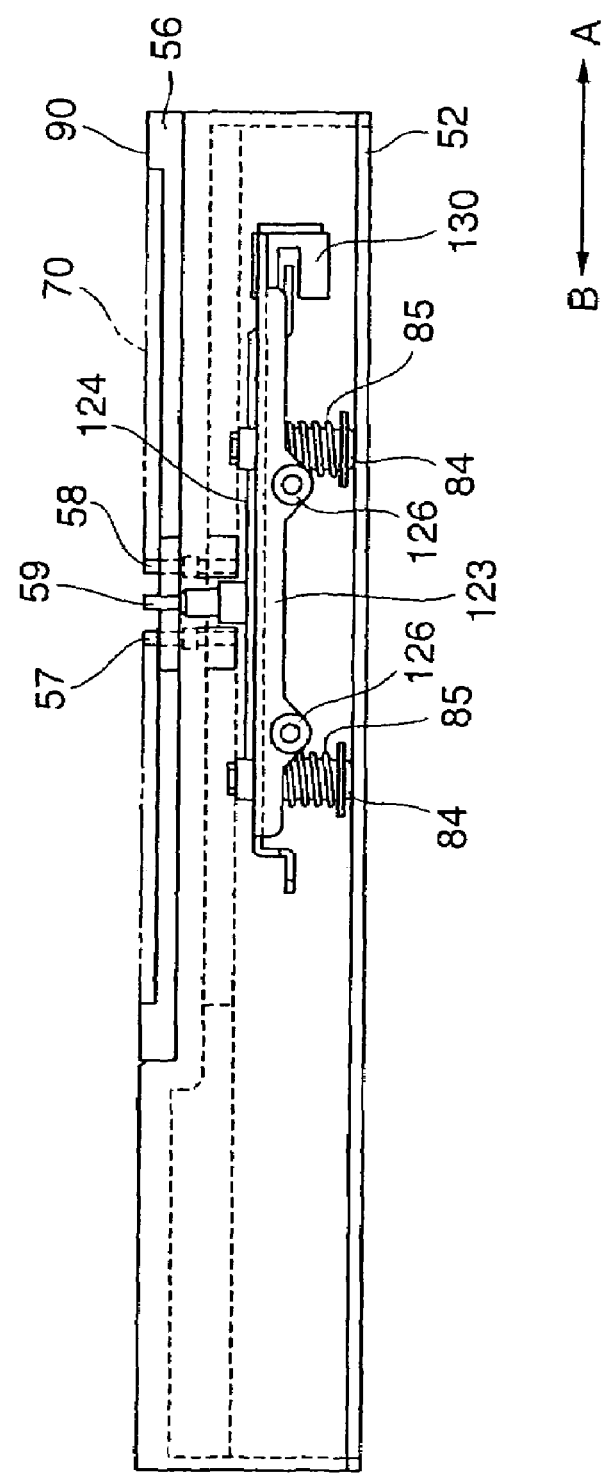
FIG. 10 is a view for explaining a supporting structure of an elevating plate.

Further, four mounting holes 132 is bored in the elevating plate 123. As shown in FIG. 10, four guide shafts 84, which are formed in the frame body 51, are inserted into the elevating plate 123 through the four mounting holes 132. The guide shafts 84 are vertically provided in the frame body 51. Compression coil springs 85 are wound around the guide shafts 84. The elevating plate 123 is always biased and supported upward by the compression coil springs 85.

Figure 11:
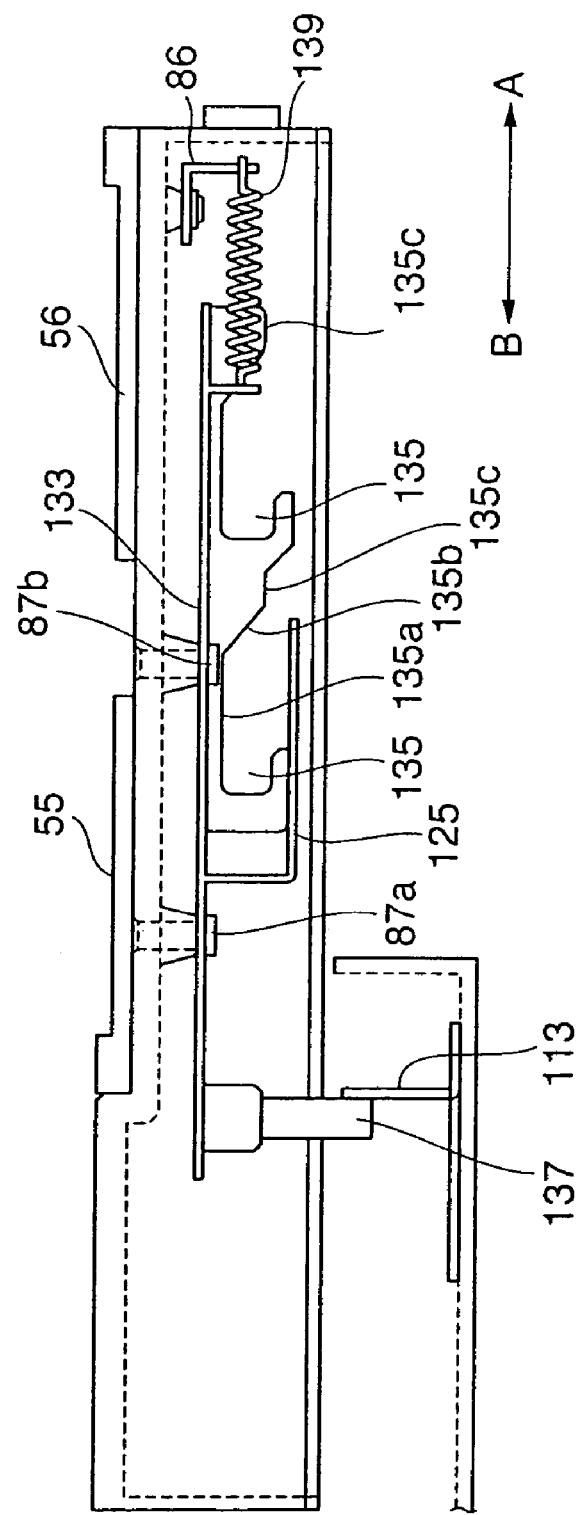
FIG. 11 is a view for explaining a supporting structure of a slide plate.

As shown in FIG. 9 and FIG. 11, the elevating mechanism 122 mainly comprises slide plate 133, a stopper 113 provided on the chassis 105 of the disc tray unit receiving part 100 of the main body of the label printer, and a support plate 86 fixed to the frame body 51.

The slide plate 133 is formed substantially in the shape of letter 'E'. The slide plate 133 has two slide arms 133*a* and 133*d* and a rotating cam 125.

Two guide grooves 134*a* and 134*b* is bored in the first slide arm 133*a* and are engaged with guide pins 87*a* and 87*b* provided in the frame body 51. Further, one lateral part of the first slide arm 133*a* is bent downward, and is formed with two elevating guides 135 that engage with the guide roller 126 journalled to the elevating plate 123. Moreover, the front end of the first slide arm 133*a* is formed with a locking piece 133*c* for locking a later-described tension coil spring.

Similarly, two guide grooves 134*c* and 134*d* are bored in the second slide arm 133*d* and are engaged with guide pins 87*c* and 87*d* provided in the frame body 51. One lateral part 133*e* of the second slide arm 133*d* is bent downward and is formed with two elevating guides 135 that engages with the guide roller 126 journalled to the elevating plate 123. Moreover, the front end of the second slide arm 133*d* is formed with a locking piece 133*f* for rocking a later-described tension coil spring. Each of the four elevating guides 135 has a horizontal part 135*a*, an oblique side part 135*b*, and a regulating part 135*c*.

The rotating cam 125 is bent and formed in the shape of a crank so as to be located below the reference plane of the slide plate 133. A bracket 136 having a guide side 136*a* is attached to the portion of the rotating cam 125, which engages with the guide pin 127 vertically provided in the rotatable arm 124.

A slide pin 137 is vertically provided at the rear end of the slide plate 133 and is abutted on the stopper 113 provided on the chassis 105 of the main body of the label printer. The slide pin passes through a slide groove 67 that is bored in the bottom plate 52 that blocks the bottom surface of the frame body 51.

The stopper 113 is arranged at the front end of the disc tray unit receiving part 100. The stopper acts to abut on the slide pin 137 of the slide plate 133 to regulate the movement of the slide plate 133.

On the support plate 86 attached to the frame body 51 is formed with locking parts 86*a* and 86*b* that locks one end of the tension coil spring. A tension coil spring 138 is provided in a tensioned state between the locking part 86*a* and the locking piece 133*c* of the first slide arm 133*a* of the slide plate 133. A tension coil spring 139 is provided in a tensioned state between the locking part 86*b* and the locking piece 133*f* of the second slide arm 133*d* of the slide plate 133. These first and second tension coil springs 138 and 139 permit the slide plate 133 to be biased in the direction (direction A in the drawings) in which the disc tray unit is ejected.

Next, the relationship between the movement of the disc tray unit and the operation of the disc holding mechanism will be described.

First, the operation when the disc tray unit is ejected will be described.

Figure 12:
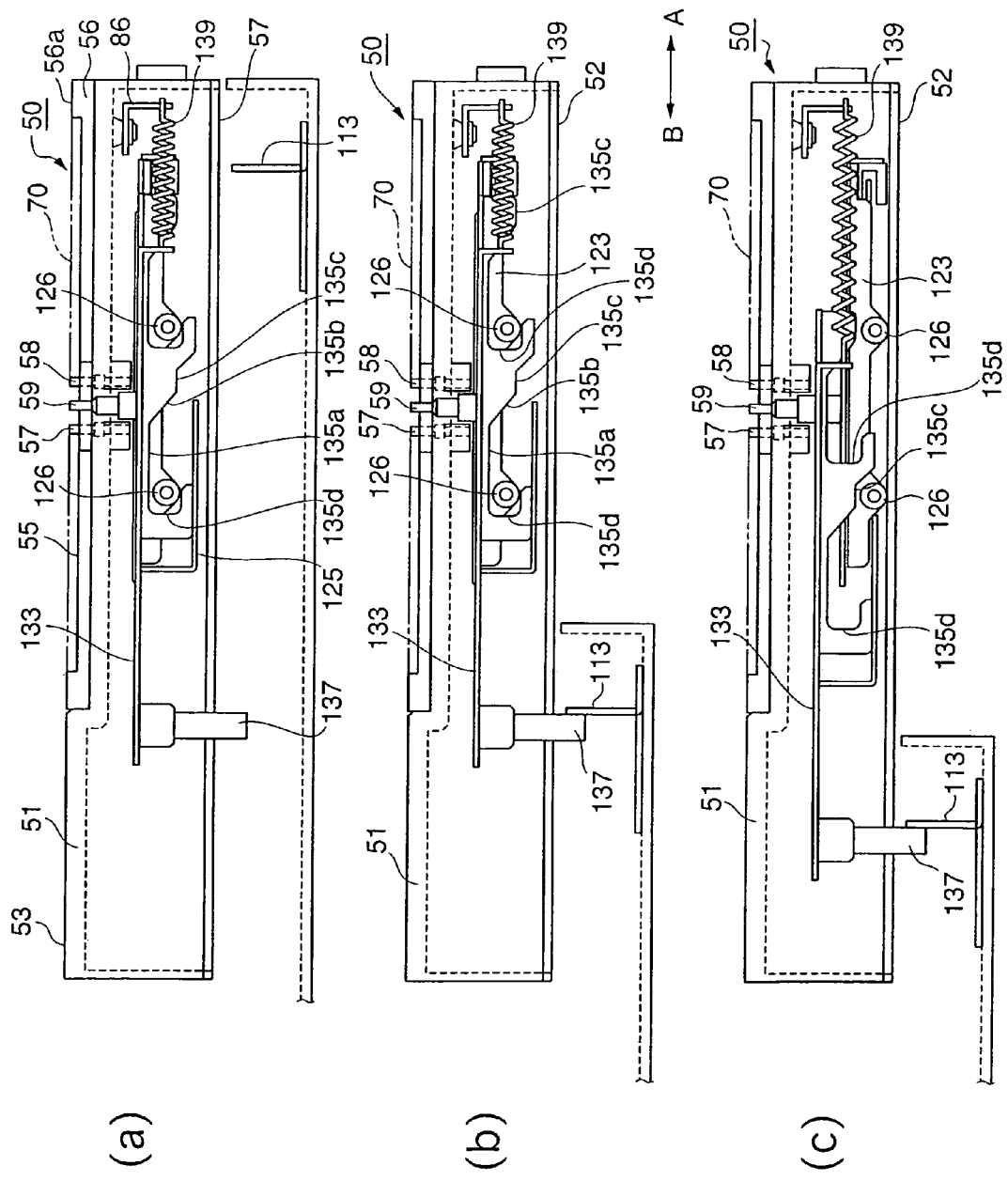
FIG. 12 is a view for explaining the operation of the disc holding mechanism that accompanies the movement of the disc tray unit.
Figure 13:
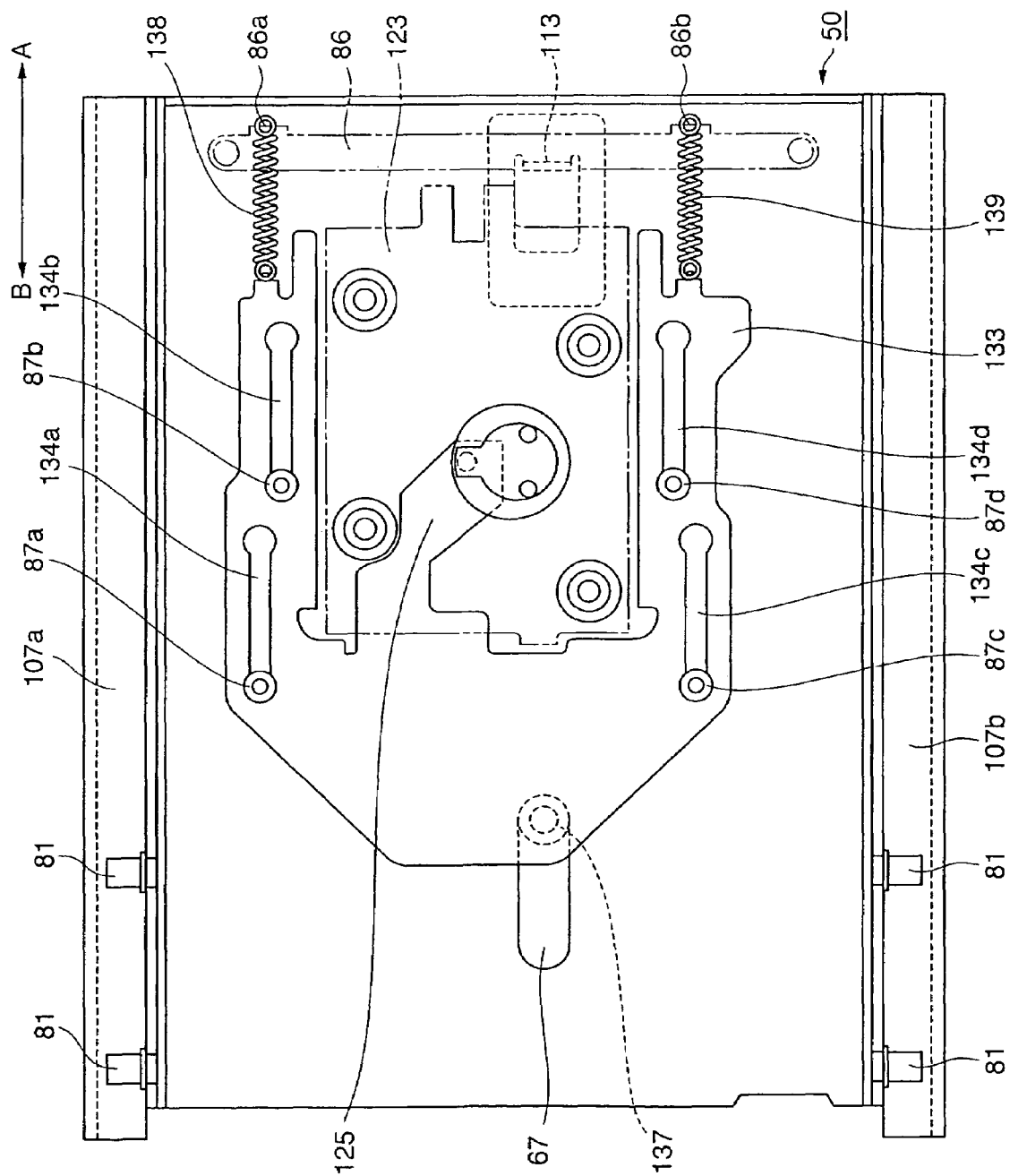
FIG. 13 is a top plan view for explaining a state and positional relationship of the elevating plate and slide plate when the disc tray unit is at its received position.
Figure 14:
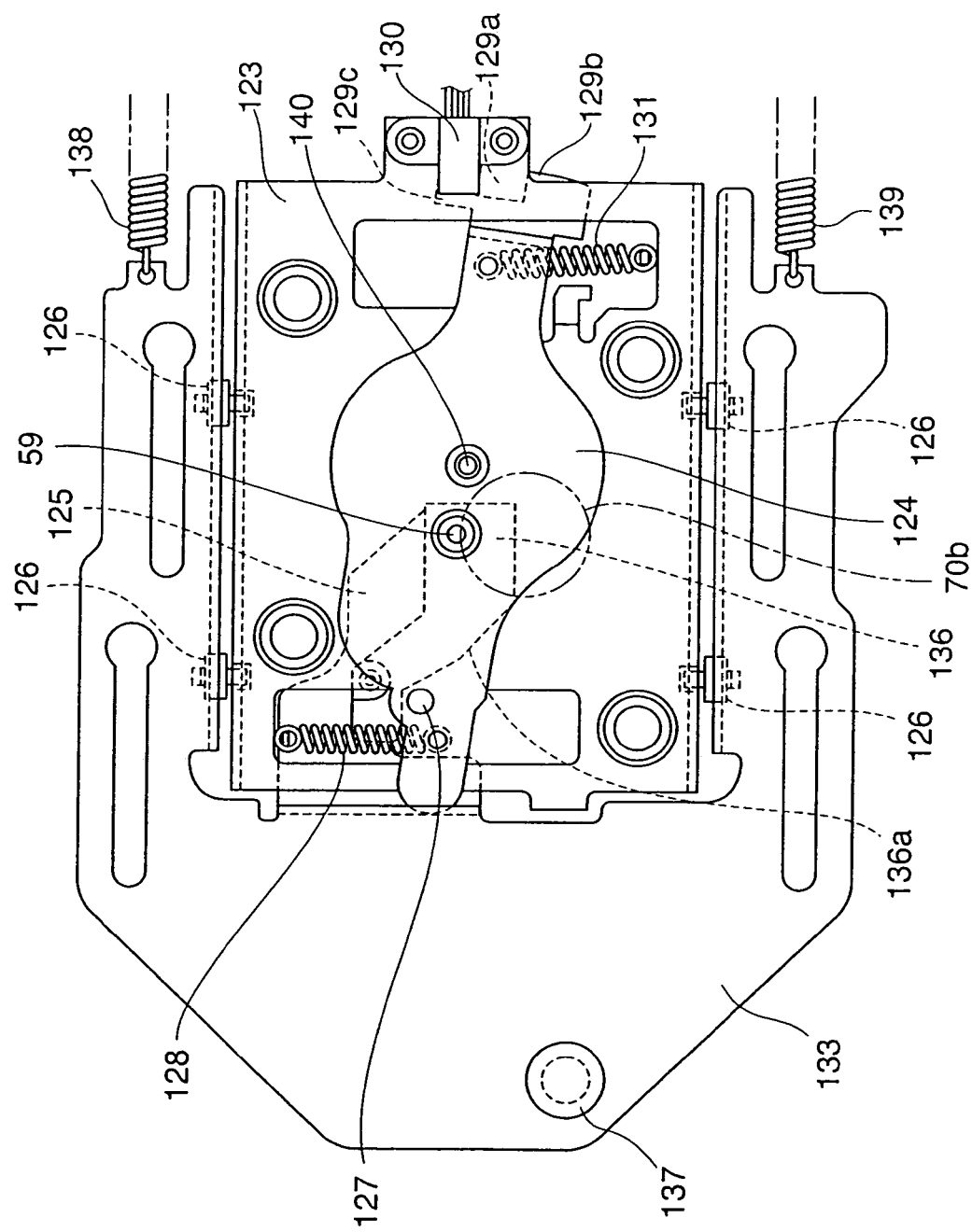
FIG. 14 is a top plan view for explaining a state of the disc holding mechanism when the disc tray unit is at its received position.
Figure 21:
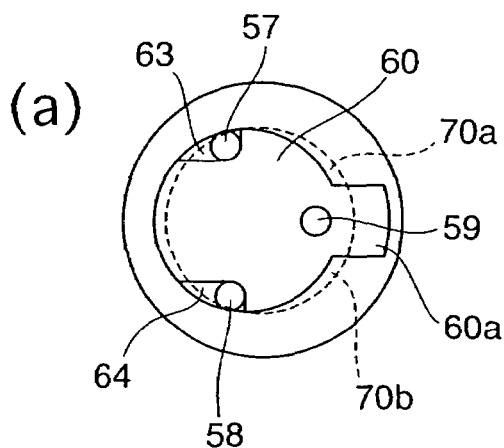
FIG. 21 is a view for explaining a position of a movable pin that accompanies the movement of the disc tray unit.
Figure 21:
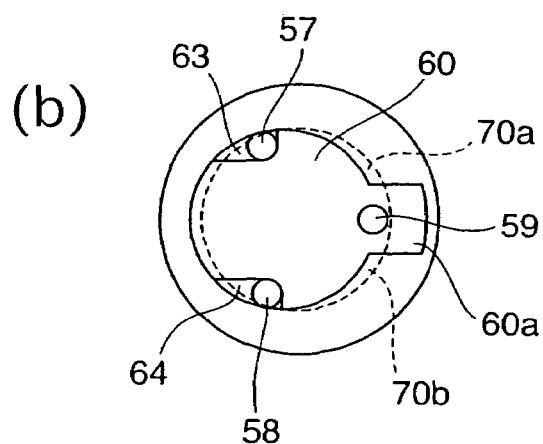
Figure 21:
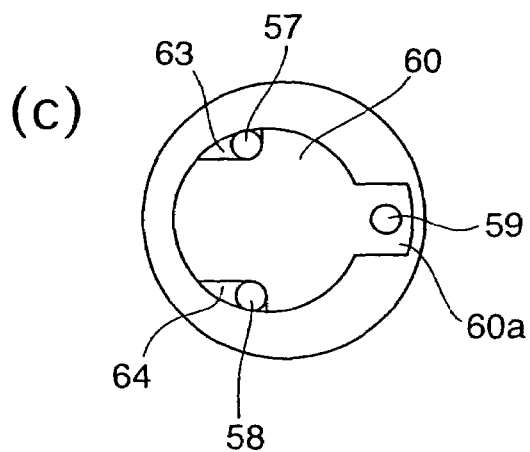

As shown in FIG. 12(*a*), FIG. 13 and FIG. 14, when the disc tray unit 50 is received in the disc tray unit receiving part 100, the slide plate 133 is moved in the direction (direction A in the drawings), in which the disc tray unit is ejected, by the biasing force of the tension coil springs 138 and 139. The elevating plate 123 ascends by the biasing force of the compression coil springs 85 that supports the elevating plate 123 and by the guiding of the guide roller 126 of the elevating plate 123 by means of the elevating guides 135 of the slide plate 133. As shown in FIG. 14, the guide pin 127 is guided by the guide side 136*a* of the rotating cam 125 of the slide plate 133, so that the rotatable arm 124 journalled to the elevating plate 123 rotates in the clockwise direction by the biasing force of the tension coil springs 128 and 131. In a state shown in FIG. 14, the optical disc is not placed on. Thus, the rotatable arm 124 rotates to a position where the rotation of the arm in the clockwise direction is regulated. As shown in FIG. 21(*c*), the movable pins 59 in the rotatable arm 124 moves to a position that has completely entered the recess 60*a* of the clamping hole 60 bored in the frame body. At this time, the second tongue piece 129*c* of the rotatable arm 124 shields the photosensor 130. Thus, a signal indicating that any optical disc is not placed on is transmitted to a controller (not shown) of the main body of the label printer.

Then, when the wheel 102 is driven using a driving motor (not shown) and the timing belt 103 is driven so as to be fed in the direction (direction A) in which the disc tray unit is ejected, the disc tray unit 50 moves in the direction of "A" while it is guided by the guide rails 107*a* and 107*b* and the pair of guide members 109*a* and 109*b*.

Figure 15:
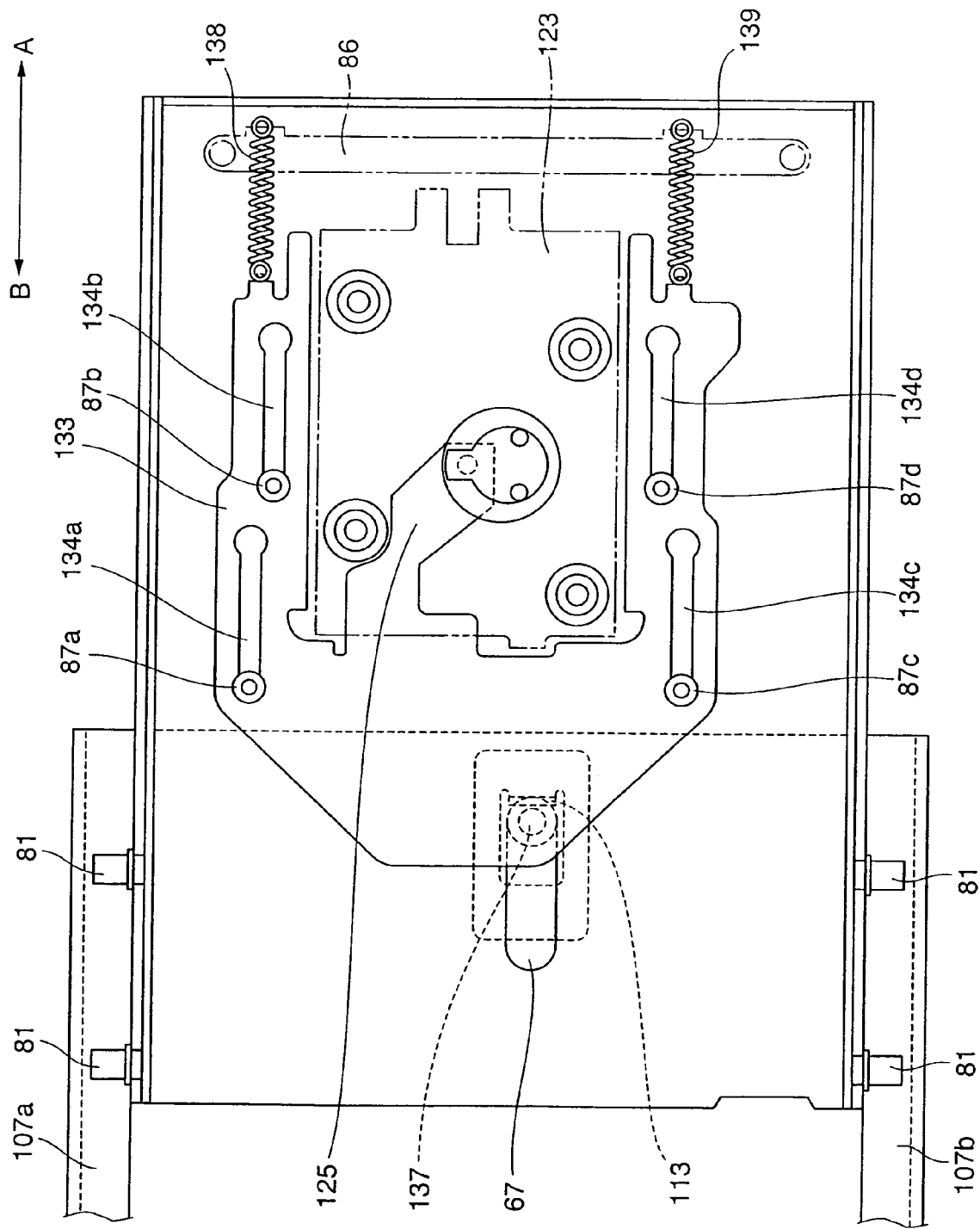
FIG. 15 is a top plan view for explaining a state and positional relationship of the elevating plate and slide plate while the disc tray unit moves.
Figure 16:
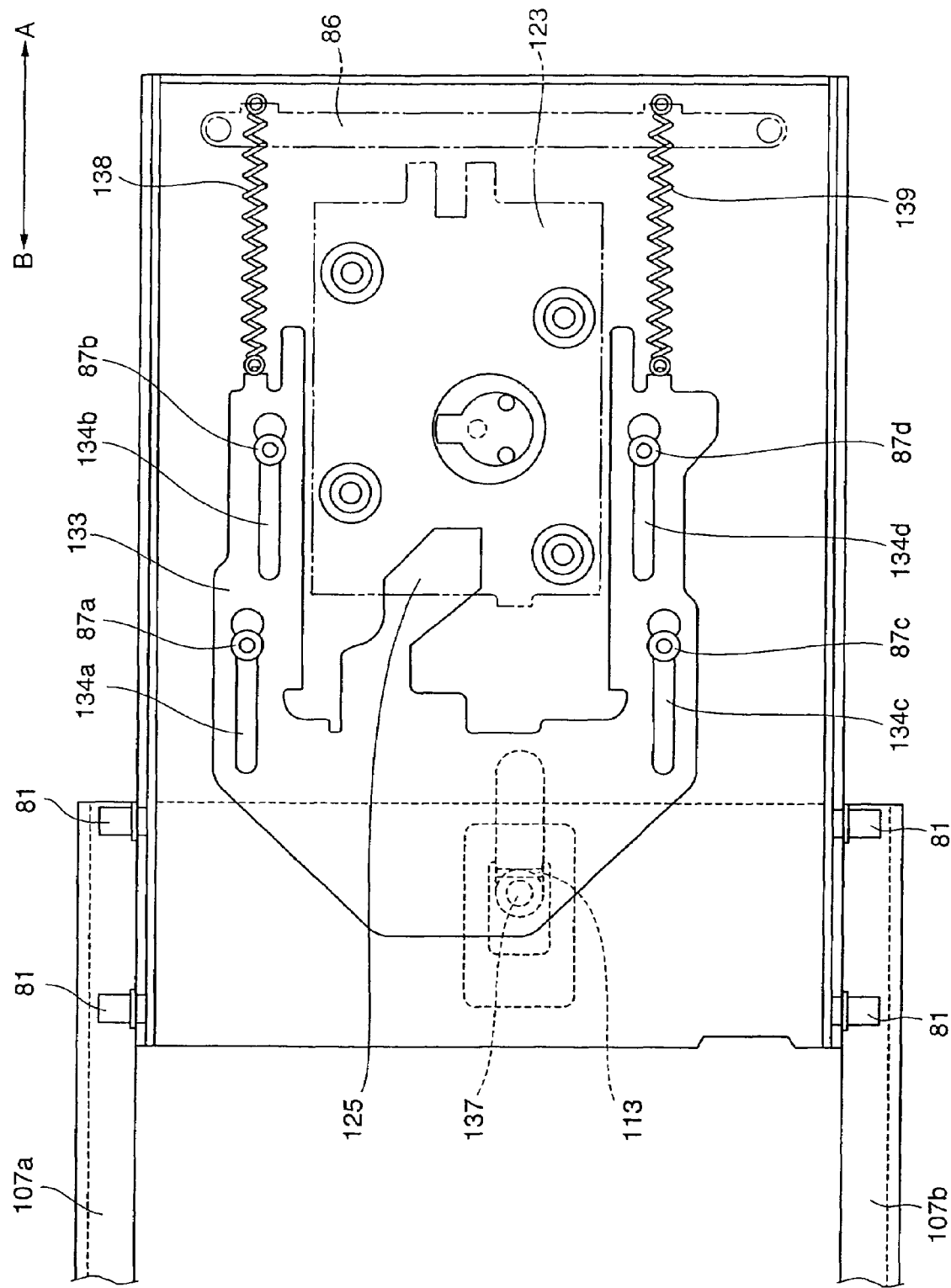
FIG. 16 is a top plan view for explaining a state and positional relationship of the elevating plate and slide plate when the disc tray unit is at its ejected position.

As shown in FIG. 12 and FIG. 15, when the disc tray unit 50 moves in the direction of "A" by about ⅔ of the total traveling distance, the slide pin 137, which is vertically provided in the slide plate 133, abuts on the stopper 113 that is arranged on the chassis of the disc tray receiving part 100, thereby regulating the movement of the slide plate 133. At this time, the relationship of the slide plate and the elevating plate and the positional relationship of the rotatable arm is not changed.

When the disc tray unit 50 further moves from the position shown in FIGS. 12(*b*) and 15, the stopper 113 regulates the movement of the slide plate 133. Thus, the only the frame body 51 and the elevating plate 123 move in the direction of "A". The stopper 113 regulates the movement of the slide plate 133 to fix the slide plate in place. Thus, when only the frame body 51 and elevating plate 123 moves in the direction of "A", the rotatable arm 124 and the elevating plate 123 operate by the rotating cam 125 formed in the slide plate 133, and the elevating guides 135. Moreover, the slide pin 137 slides along the slide groove 67 that is bored in the bottom plate 52 of the disc tray unit 50. Thus, the slide pin 137 does not obstruct the movement of the frame body.

The rotatable arm 124 operates while the guide roller 126 of the elevating plate 123 moves along the horizontal parts 135*a* of the elevating guides 135 of the slide plate 133.

Figure 17:
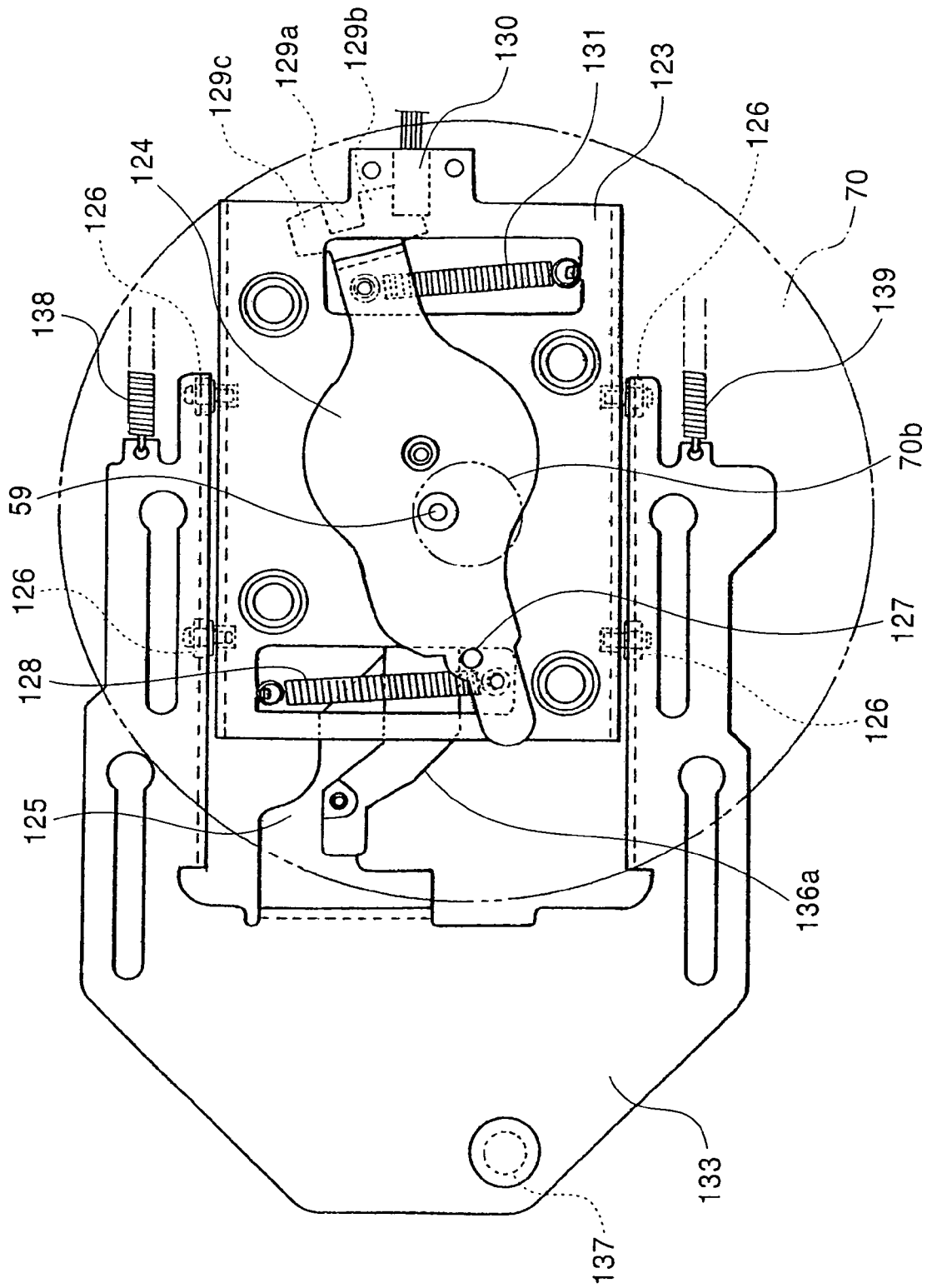
FIG. 17 is a top plan view for explaining a state of the disc holding mechanism when the disc tray unit is at its ejected position.
Figure 18:
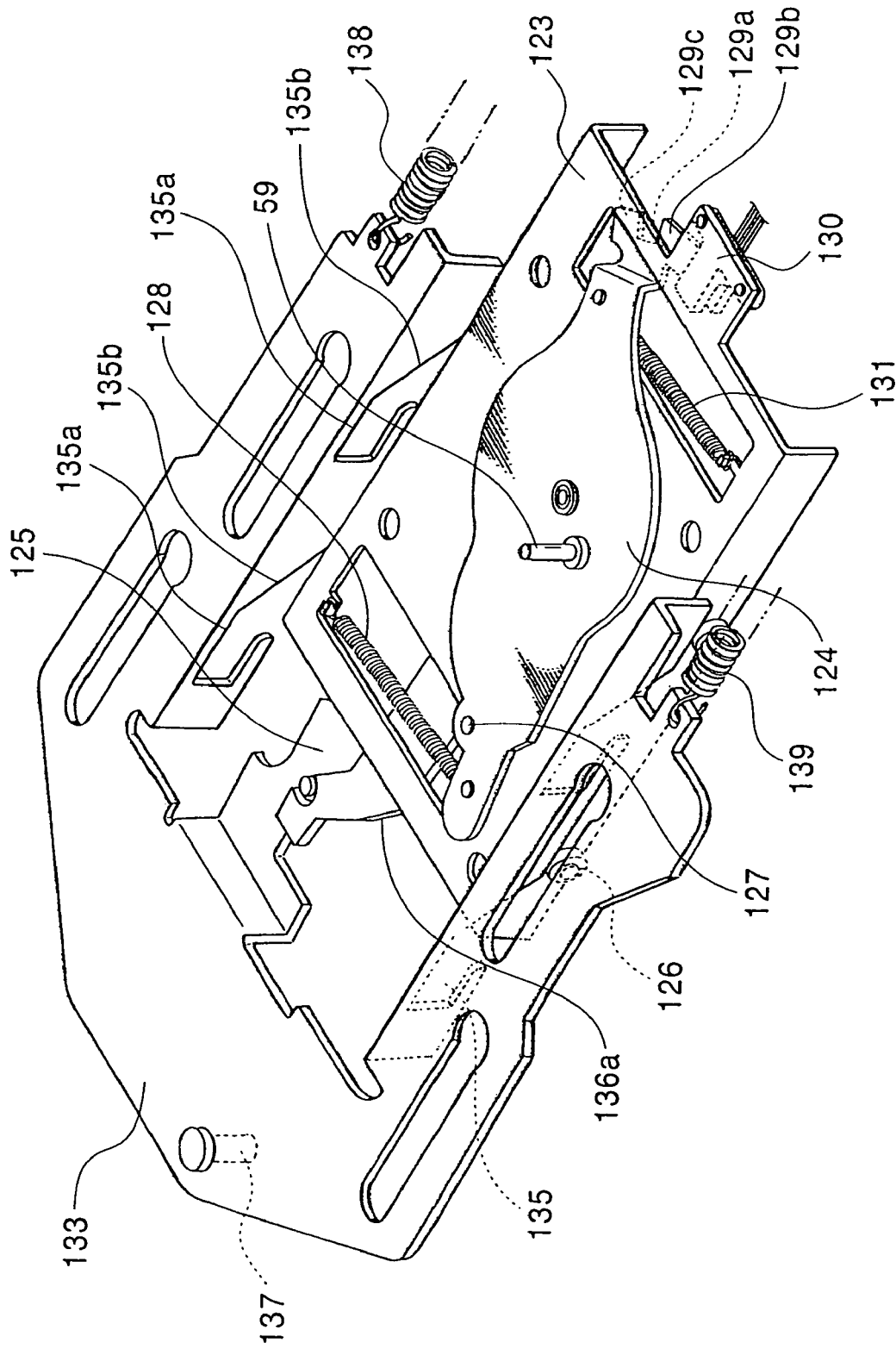
FIG. 18 is a perspective view for explaining a state of the disc holding mechanism when the disc tray unit is at its ejected position.

As the elevating plate 123 moves horizontally, the guide pin 127 vertically provided in the rotatable arm 124 is guided by the guide side 136*a* of the rotating cam 124 while it abuts thereon, so that the rotatable arm 124 rotates in the counterclockwise direction against the biasing force of the tension coil springs 128 and 131, as shown in FIG. 17. As the rotatable arm 124 rotates, as shown in FIG. 21(*a*), the movable pin 59 moves toward the center of the clamping hole bored in the frame body 51, i.e., in the centripetal direction of the central hole 70*a* of the optical disc, and move to the position where the holding state of the optical disc 70 is released. At this time, the first tongue pieces 129*b* of the rotatable arm 124 shield the photosensor 130. Thus, a signal indicating that the movable pin 59 is released and the optical disc is in an attachable/detachable state is transmitted to a controller (not shown) of the main body of the label printer.

When the elevating plate 123 reaches the oblique side parts 135*b* of the elevating guides 135, the guide roller 126 of the elevating plate 123 is guided by the oblique side parts 135*b*, and the elevating plate 123 gradually descends against the biasing force of the compression coil springs that support the elevating plate 123. At this time, as shown in FIG. 12(*c*) and FIG. 18, the movable pin 59 on the rotatable arm also descends along with the elevating plate 123. Thus, the movable pin 59 is received within the frame body, and the central hole 70*a* of the optical disc is released.

When the first positioning sensor 111 arranged in front of the disc tray unit receiving part 100 detects the detecting member 68 vertically provided in the disc tray unit 50, a signal is transmitted to a controller (not shown) of the main body of the label printer, and the driving motor (not shown) is stopped based on the signal, whereby the ejecting operation of the disc tray unit stops. At this time, as shown in FIG. 12(*c*), the regulating parts 135*c* of the elevating guides 135 of the slide plate 133 regulate the ascending movement of the guide roller 126 of the elevating plate 123. Thus, the elevating plate 123 is fixedly held at its ascending position.

Next, the operation when a disc is placed on the disc tray, and the disc tray unit 50 is received in the disc tray receiving part 100 will be described. Further, when an optical disc is placed on the disc tray 90 and the disc tray unit 50 is moved to the disc tray unit receiving part 100, the disc tray unit is moved by the reverse operation of the ejecting operation.

When the wheel 102 is driven by a driving motor (not shown) and the timing belt 103 is wound in the direction (direction B) in which the disc tray unit is received, the disc tray unit 50 moves in the direction of "B" while it is guided by the guide rails 107a and 107b and the pair of guide member 109a and 109b. At this time, the slide pin 137 is pressed against the stopper 113 with the biasing force of the tension coil spring 138 and 139. Thus, the sliding plate 133 is regulated in its position and is fixed in place.

When the elevating plate 123 moves in the direction of "B" with the movement of the disc tray unit 50, the guide roller 126 of the elevating plate 123 is released from the regulating parts 135c formed in the elevating guides 135 of the slide plate 133 that have regulated the ascending movement of the elevating plate 123. Thus, the elevating plate 123 gradually ascends by the biasing force of the compression coil spring 85 that supports the elevating plate 123 and by the guiding of the guide roller 126. At this time, the movable pin 59 on the movable arm also ascends along with the elevating plate 123. Thus, the movable pin 59 protrudes above disc tray and enters the central hole 70a of the placed optical disc 70.

When the elevating plate 123 ascends and the guide roller 126 reaches the horizontal parts 135a of the elevating guides 135, the rotatable arm 124 journalled to the elevating plate 123 begins to operate. Immediately after the elevating plate 123, as shown in FIG. 17, the guide pin 127 abuts on the front end of the guide side 136a of the rotating cam 125 of the slide plate 133 ascends, and rotated in the counterclockwise direction against the biasing force of the tension coil spring 128 and 131.

When the disc tray unit 50 further moves in the direction of 'B' and the elevating plate 123 moves while it is guided the horizontal parts 135a of the elevating guides 135, the guide pin 127 is guided by the biasing force of the tension coil springs 128 and 131 and the guide side 136a of the rotating cam 125, and is gradually rotated. At this time, the movable pin 59 on the rotatable arm also rotates in the clockwise direction and abuts on an inner diameter part of the optical disc 70 placed on the disc tray 90 as the disc tray unit 50 moves.

Figure 19:
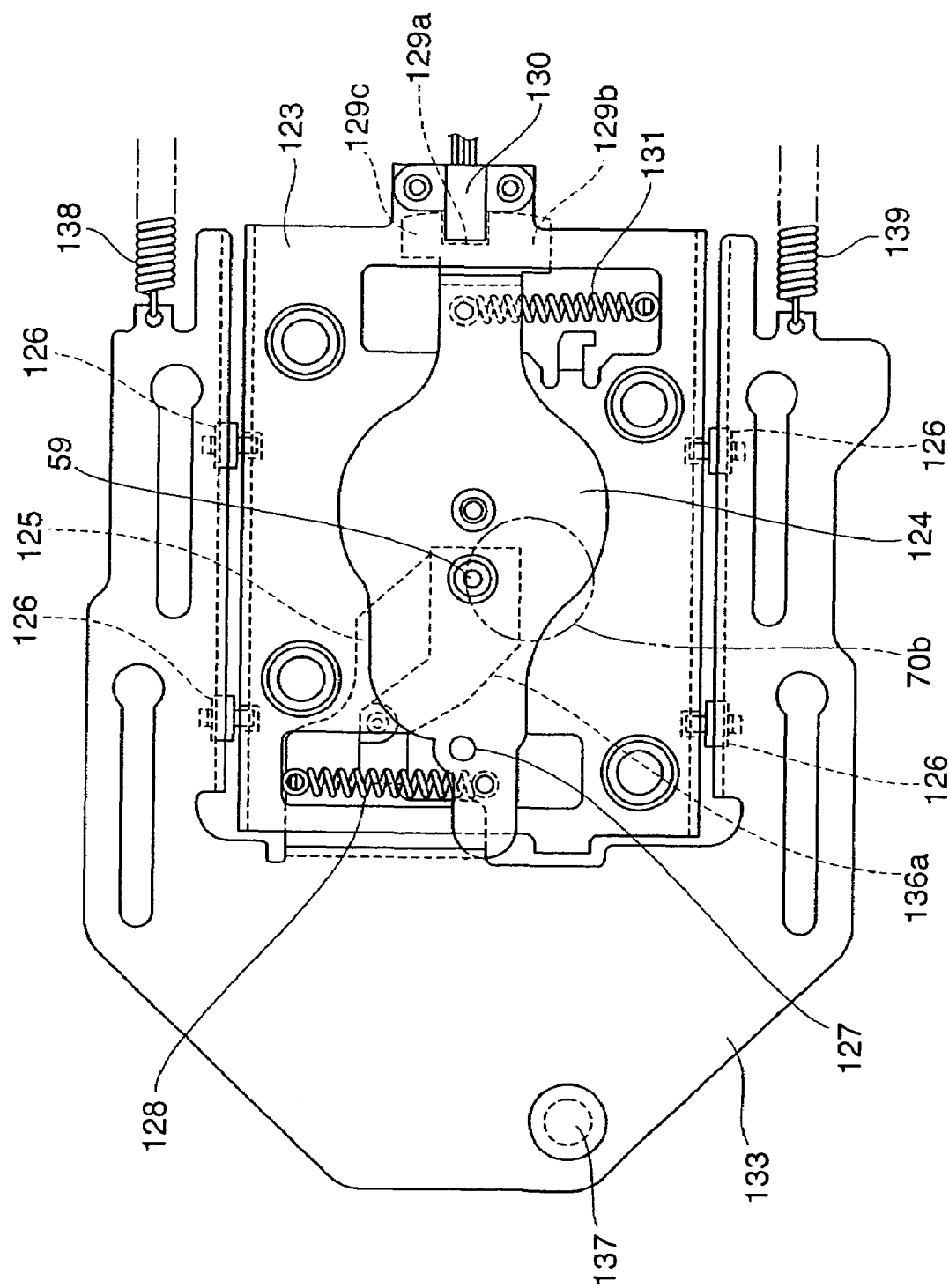
FIG. 19 is a top plan view for explaining a state of the disc holding mechanism when a disc is placed on a disc tray and then the disc tray unit moves to its received position.
Figure 20:
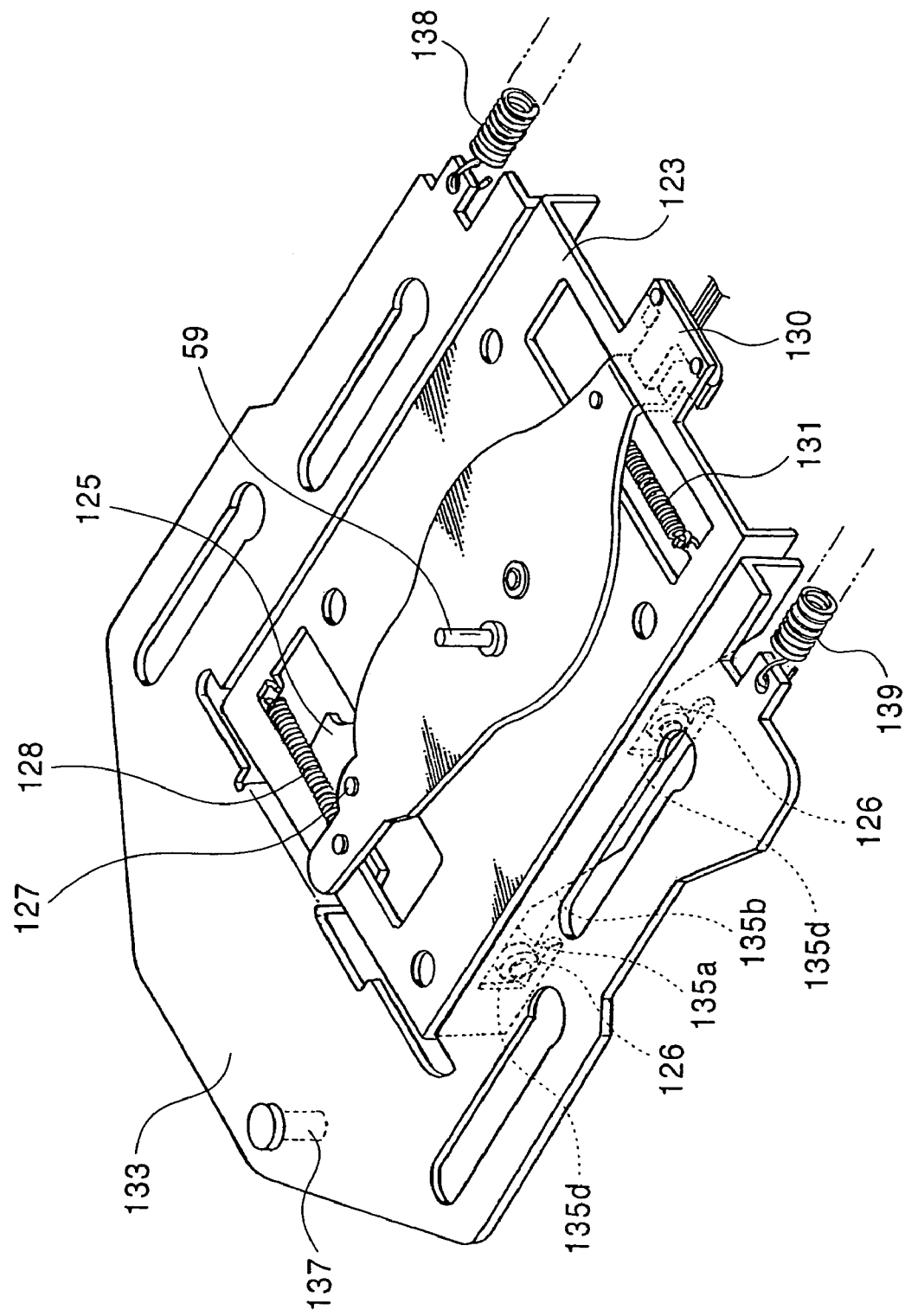
FIG. 20 is a perspective view for explaining a state of the disc holding mechanism when the tray is placed on the disc tray and then the disc tray unit moves to its received position.

When the elevating plate 123 further moves, the guide pin 127 leaves the guide side 136a of the rotating cam 125 and a point of action of the rotatable arm 124 shifts to the movable pin 59. Thus, the biasing force of the tension coil springs 128 and 131 directly act on the movable pin 59. As a result, as shown in FIG. 21, the movable pin 59 presses the inner diameter part 70b of the optical disc in the centrifugal direction of the central hole 70a of the optical disc. Thereby, the optical disc 7 placed on the disc tray 90 is positioned by the stationary pins 57 and 59 fixed to the frame body 51, and fixedly held by the movable pin 59 and the stationary pins 57 and 58. At this time, as shown in FIG. 19 and FIG. 20, the cutout 129a of the rotatable arm 124 is located at the photosensor 130. Thus, the photosensor 130 becomes an electrically conductive state, and transmits a signal indicating that the optical disc is placed on, to a controller (not shown) of the main body of the label printer.

As shown in FIG. 12(b) and FIG. 15, when the disc tray unit 50 moves to a position where the guide roller 126 of the elevating plate 123 abuts on the ends 135d of the elevating guides 135, the biasing force of the tension coil springs 138 and 139 that has acted on the slide plate 133 reduces and the slide plate 133 is released from the regulation of movement. After the slide plate 133 is released from the regulation of movement, the slide plate 133 and the elevating plate 123 moves in the direction of 'B' with the movement of the disc tray unit 50 while they maintain a state that fixedly holds the optical disc 70 placed on the disc tray 90.

When the second positioning sensor 112 arranged behind the disc tray unit receiving part 100 detects the detecting member 68 vertically provided in the disc tray unit 50, a signal is transmitted to a controller (not shown) of the main body of the label printer, and the driving motor (not shown) is stopped based on the signal, whereby the receiving operation of the disc tray unit stops.

As apparent from the above description, the optical disc placed on the disc tray is positioned and fixedly held by the disc holding mechanism in accordance with the receiving operation. When the disc tray unit has moved to its ejected position, holding the optical disc is completely released. Thus, the optical disc can be exchanged without load being put thereon.

It is also configured that the inner diameter part of the optical disc is pressed in the centrifugal direction of the central hole of the optical disc to position and fix the optical disc of the disc tray. Thus, irrespective of the shape of an optical disc, the optical disc can be surely positioned and held. As a result, it is possible to automate disc exchange.

Next, the detail of functions to determine whether a disc is placed on a disc tray will be described.

Figure 22:
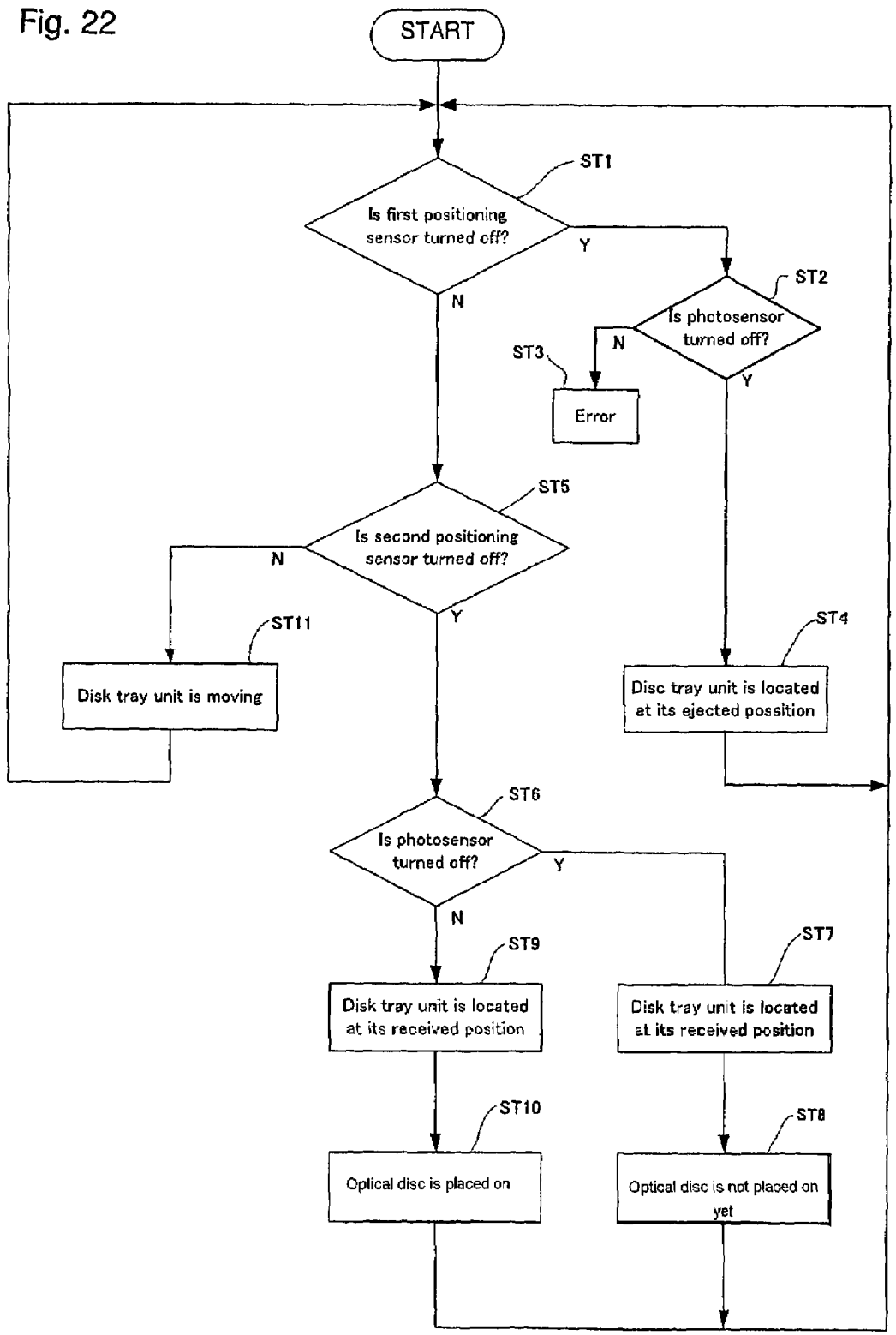
FIG. 22 is a control flowchart for determining a disc placed on state.
Figure 23:
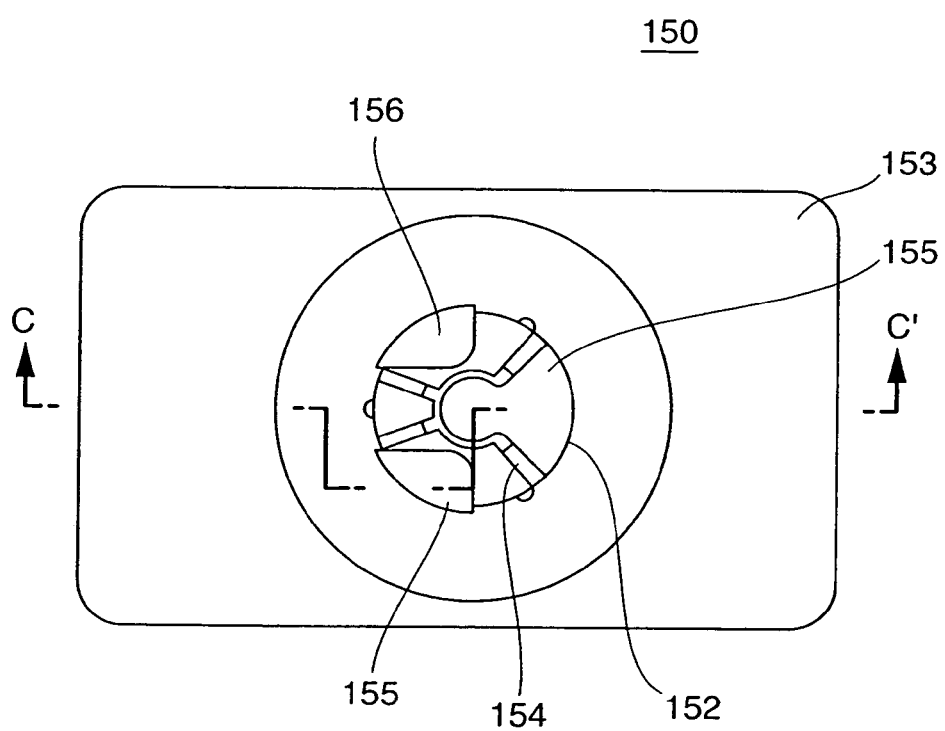
FIG. 23 is a bottom plan view of a clamper.

FIG. 22 shows a control flowchart for determining whether a disc is placed on a disc tray.

When power is input to the label printer, in order to confirm the position of the disc tray unit 50, it is confirmed whether the first positioning sensor 111 is turned off (ST1). In case the first positioning sensor 111 is turned off, that is, the detecting member 68 vertically provided in the disc tray unit 50 detects that a photo-interrupter as the first positioning sensor 111 is in its shielded state, the photosensor 130 arranged in the slide plate 130 is shielded by the first tongue piece 129b formed in the rotatable arm 124, it is confirmed that the output of the photosensor 130 is off (ST2), and it is recognized that the disc tray unit 50 is located at its ejected position (ST3). Further, when the first positioning sensor 111 is in its turned-off state, in view of the structure of the disc tray unit 50, there may not occur that the photosensor 130 is turned on. Thus, in case it is detected in Step 2 that the photosensor 130 is in its turned-on state, error processing of notifying a user of an apparatus failure or the like as a state that may not occur normally is performed (ST4).

On the other hand, when it is detected in Step 1 that the first positioning sensor 111 is turned on, it is confirmed whether the second positioning sensor 112 is turned off (ST5). In case the second positioning sensor 112 is turned off, that is, the detecting member 68 vertically provided in the disc tray unit 50 detects that a photo-interrupter as the second positioning sensor 112 is in its shielded state, the output state of the photosensor 130 arranged at the slide plate 133 is confirmed (ST6).

When it is confirmed in Step 6 that the photosensor 130 arranged at the slide plate 133 is shielded by the second tongue piece 129c formed in the rotatable arm 124, and the output of the photosensor 130 is off, it is recognized that the disc tray unit 50 is located at its received position (ST7), and it is recognized that any optical disc is not placed on yet (ST8).

On the other hand, it is confirmed in Step 6 that the photosensor 130 arranged at the slide plate 133 becomes its electrically conductive state by the cutout 129a formed in the rotatable arm 124, and that the output of the photosensor 130 is on, it is recognized that the disc tray unit 50 is located at its received position (ST9) and it is recognized that an optical disc is placed on (ST10).

Further, when it is confirmed in Step 5 that the second positioning sensor 112 is turned on, since both the first positioning sensor 111 and the second positioning sensor 112 are turned on, it is confirmed that the disc tray unit 50 is moving (ST11).

Immediately after the input of power, generally, the disc tray unit 50 is located either at its ejected position or at its inserted position and the optical disc is not placed on. Thus, it is recognized that the disc tray unit 50 is the state in Step 4 or Step 7. However, in case the disc tray unit 50 stops during the movement thereof due to an unexpected accident, etc., it is recognized that the disc tray unit is the state in Step 9. Thus, reset processing is carried out. For example, after the disc tray unit 50 is first received and it is confirmed whether any optical disc is placed on the disc tray 90, the disc tray unit 50 is controlled to move to its ejected position.

As described above, a state of an optical disc placed on the disc tray 90 can be detected by the cutout 129a and tongue pieces 129b and 129c that are formed in the rotatable arm 124. Consequently, the state of an optical disc to the disc tray 90 can be detected in accordance with the position of movable pin 59 that controls the holding state of the disc. Thus, the absence or presence of an optical disc on the disc tray can be automatically detected, and the erroneous operation of an apparatus such as a label printer can be surely prevented.

Figure 24:
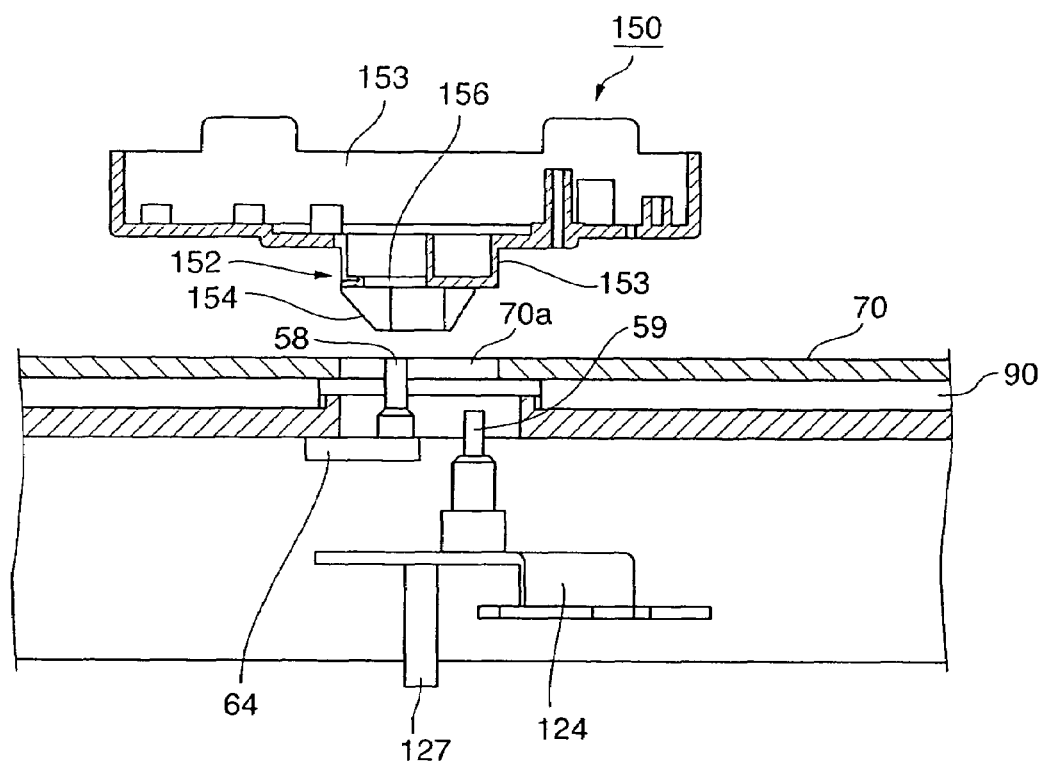
FIG. 24 is a sectional view for explaining a relationship of coupling between the disc tray unit and the clamper.
Figure 24:
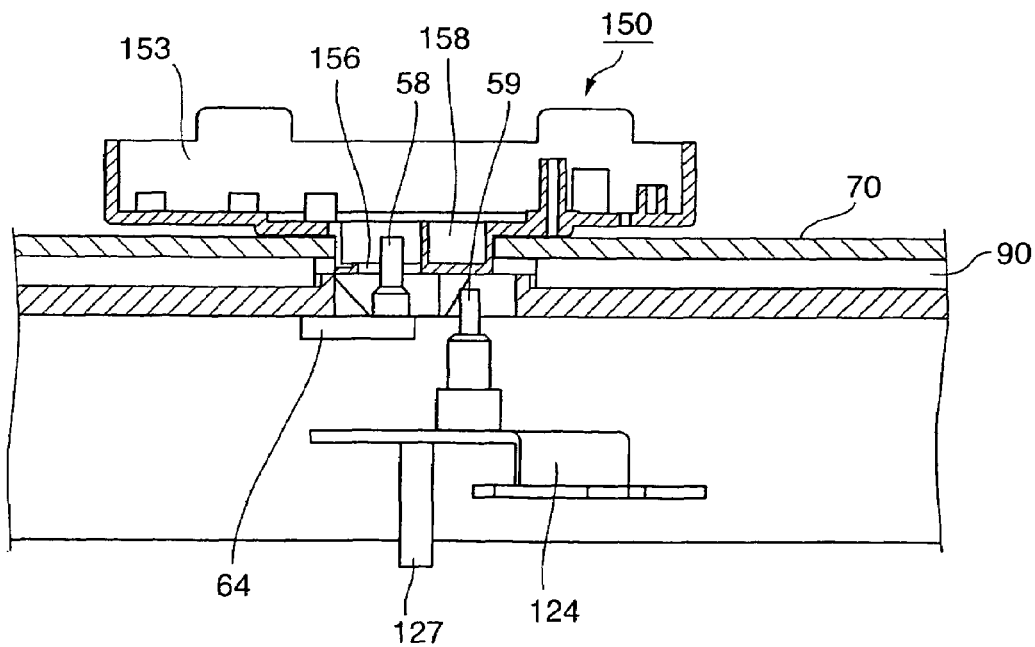
Figure 25:
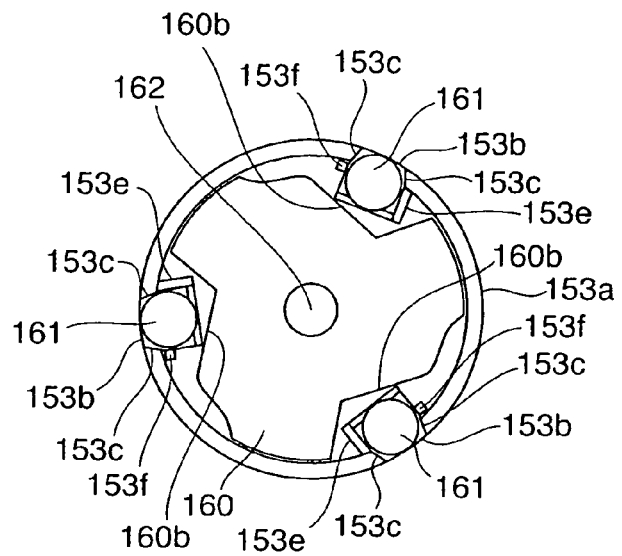
FIG. 25 is a view for explaining the principle of operation of a clamping mechanism.
Figure 25:
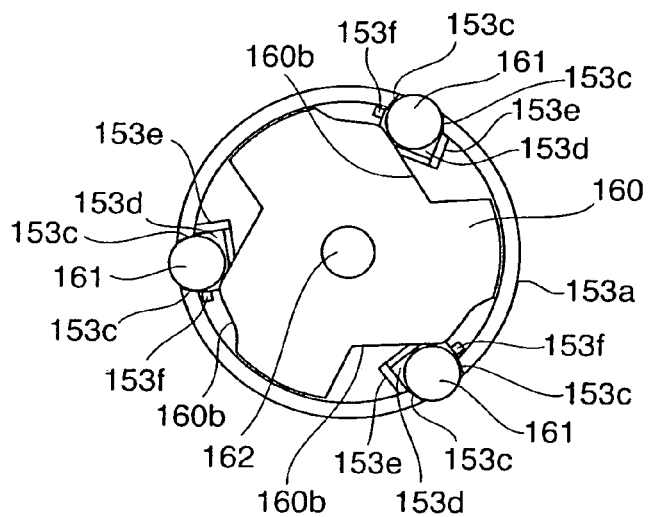

Referring to FIGS. 23 to 26, the construction of a clamper that clamps a disc placed on the disc tray will now be described. FIG. 24 shows a sectional view when the bottom plan view shown in FIG. 24 is cut with one-dotted chain line C-C'. Further, the illustration and description of an elevating mechanism of the clamper will be omitted.

A clamper 150 includes a casing part 151 provided within a clamping mechanism, and a clamping head 152 that is fitted into the central hole 70a of the optical disc 70 placed on the disc tray 90.

The clamping head 152 has a cylindrical part 153 having the same size as the central hole 70a of the disc, and a tapered part 154 formed in a trapezoidal shape in section in order to allow the clamping head 152 to be easily fitted into the central hole 70a. At portions of the clamping head 152 corresponding to the stationary pins 57 and 58 fixed to the frame body 51, escape holes 155 and 156 are bored for letting the stationary pins 57 and 58 escape when the optical disc 70 is clamped. At a portion of the tapered part 154 corresponding to the movable pin 59, a space 157 is formed for avoiding the interference with the apex 59a of the movable pin 59. However, the movable pin 59 descends into the frame body and is received therein when the disc tray unit 50 is located at its ejected position. Thus, any particular escape hole is not bored in the clamping head 152. In an inner space 158 of the clamping head secured by causing the ascending movable pin 59 to descend into the frame body and to be received therein, a part of a clamping mechanism for clamping an optical disc is provided.

The clamping mechanism 150 includes a movable cam 160 and rolling spherical bodies 161, which press the inner diameter part 70b of the disc in the centrifugal direction of the central hole 70a of the disc, and a driving mechanism (not shown) that drives the movable cam 160.

At a circumferential wall 153a of the cylindrical part 153 of the clamping head 152, openings 153b are formed at the corresponding positions obtained by dividing the angle of the whole circumference into three. At the ends of peripheral walls of these openings, tapered surfaces 153c that are inwardly broadened are formed.

Also, receiving parts 153d of the rolling spherical bodies 161 whose bottom faces are depressed in the centrifugal direction from the openings 153b. Larger and smaller walls 153e and 153f are formed on both sides of each of the receiving parts 153d.

The rolling spherical bodies 161 are ideally formed of a metallic material. However, the materials of the rolling spherical bodies are not limited thereto as long as they have sufficient rigidity. It is also required that the rolling spherical bodies do not fall from the openings 153b, and the surfaces of the spherical bodies slightly has outline dimensions such that they protrude out of the circumferential wall 153a.

Figure 26:
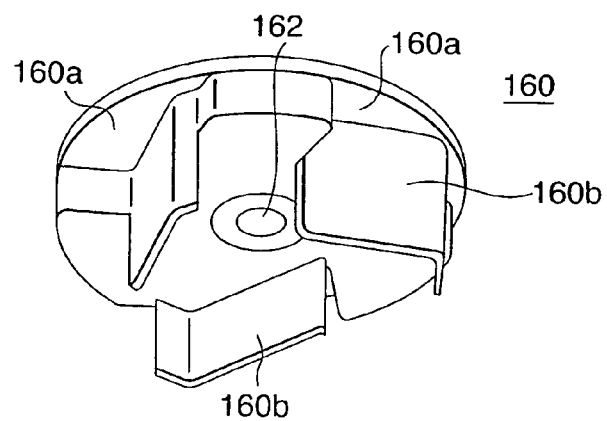
FIG. 26 is a perspective view of a movable cam.
Figure 27:
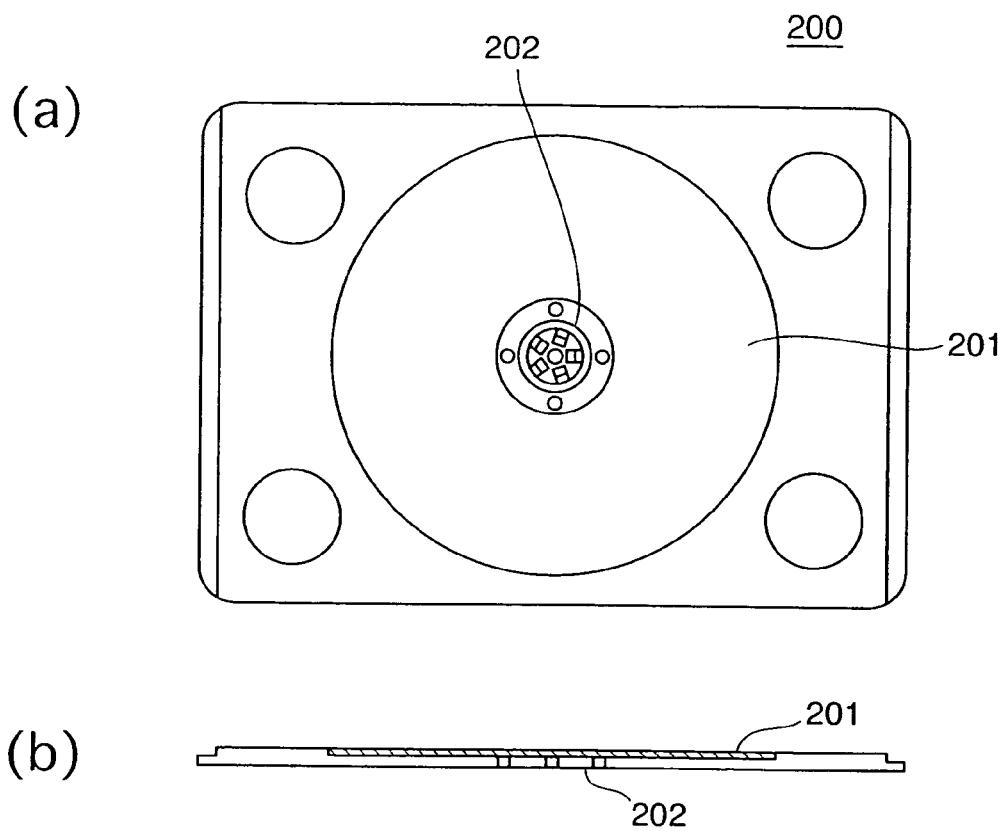
FIG. 27 shows a conventional printer tray.
Figure 28:
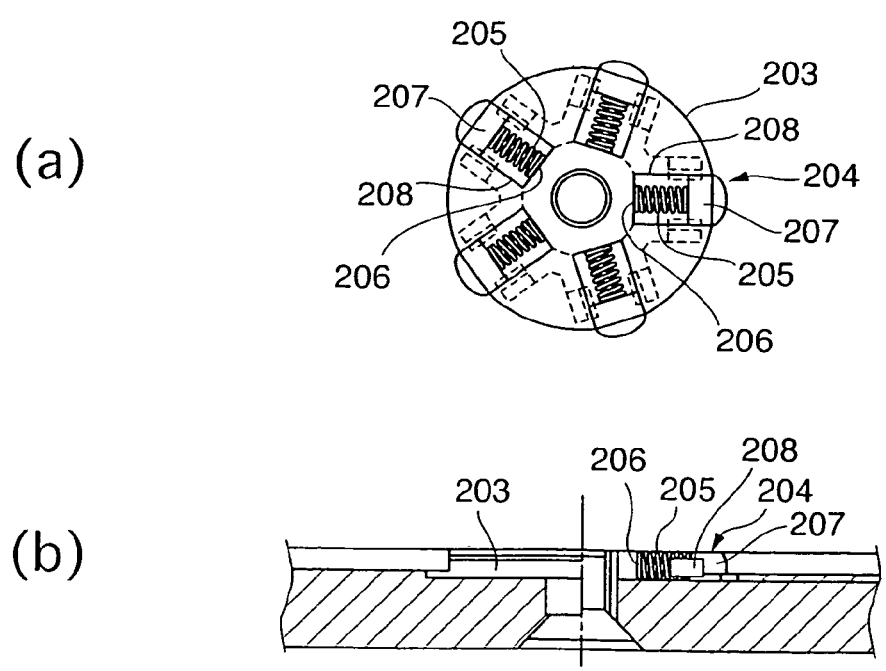
FIG. 28 is a view for explaining the construction of a conventional positioning mechanism.

As shown in FIG. 26, the movable cam 160 is formed with cam grooves 160a at positions corresponding to the receiving parts 153d of the cylindrical parts 153. The cam grooves 160a is formed with cam slopes 160b that acts on the spherical bodies 161 while avoiding any interference with the stationary pins 57 and 58 of the frame body 51. Also, the center of the movable cam 160 is formed with an axial bore 162 through which a driving shaft (not shown) vertically provided from the driving mechanism is inserted.

The aspects of operation of the clamping mechanism constructed as above will be described below with reference to FIG. 25(a) and FIG. 25(b).

When the movement of the disc tray unit 50 to its ejected position is completed, the clamping head 150 descends from the upside, and is fitted into the central hole 70a of the optical disc 70 placed on the disc tray 90. At this time, the stationary pins 57 and 58 of the frame body 51 are inserted through the escape holes 155 and 156 of the clamping head 152, whereby the tapered part 154 of the clamping head 152 is fitted into the clamping hole 60 of the frame body 51.

Then, when a clamper driving mechanism (not shown) provided within the casing part 151 of the clamper 150 is driven and the movable cam 160 rotates in the clockwise direction, as shown in FIG. 25(b), the cam slope 160b biases the rolling spherical bodies 161 to push out them in the centrifugal direction. Then, the surfaces of the rolling spherical bodies 161 slightly protrude from the circumferential wall 153a of the cylindrical part 153 of the clamping head 152, and the rolling spherical bodies 161 presses the inner diameter part 70b of the disc in the centrifugal direction of the central hole 70a of the disc.

Then, when the optical disc 70 is clamped, the clamper 150 ascends. At this time, the optical disc is conveyed to a stocker that receives and keeps a plurality of discs (not shown).

Moreover, in case the optical disc 70 is released from the clamping, when a clamper driving mechanism (not shown) is driven to rotate the movable cam 160 in the counterclockwise direction, as shown in FIG. 25(a), the biasing force to the rolling spherical bodies 161 is released and the movement of the rolling spherical bodies 161 in the centrifugal direction becomes free. Thus, the biasing force to the inner diameter part of the disc is released and the optical disc 70 is released from the clamping.

As apparent from the above description, when the disc tray unit moves to its ejected position, the movable pin along with the elevating plate is caused to descend, so that a space can be secured in the clamping hole and the clamper can be easily fitted into the clamping hole.

Further, a clamping mechanism can be provided within the clamper using a space obtained by causing the holding pin (movable pin) that may become an obstacle when clamping an optical disc to be descended. Thus, the clamping mechanism can be made small, and the optical disc can be surely positioned and held irrespective of the shape of the optical disc.

Moreover, the present invention is not limited to the above embodiment, and can be modified in a range that does not depart from the spirits as defined in the claims.

For example, in the above embodiment, the adapter 56 is attached in an exchangeable manner wherein the adapter is formed with the disc placing part 55 according to the shape of an optical disc to be subjected to printing. However, a construction may be adopted in which a scanner mechanism (not shown) is arranged at a portion through which the disc tray unit 50 of the label printer is passed and the shape and orientation of an optical disc placed on the disc placing part 55 is read interlockingly with the operation that the optical disc is received or ejected so that data is transmitted to a host computer.

In that case, the state of the optical disc placed on the disc placing part 55 can be recognized with a host computer, and a user can adjust a printed image based on the data. Thus, the adapter 56 can be used in common, and it is possible to cope with various discs having complicated shapes.

Further, in the above embodiment, the plurality of holding pins includes only one movable pin. However, in order to secure a larger space for the clamping hole 60, the holding pins may include a plurality of the movable pins. However, in order to reduce the variation of the positions of label images to be subjected to printing, it is indispensable to provide stationary pins for positioning an optical disc in place. Thus, it is possible to avoid making all of the holding pins the movable pins.

Further, in the above embodiment, the optical disc is given as an example of the optical medium. However, the optical medium is not limited thereto. Also, an apparatus to which the present invention is applied is not limited to the label printer.

What is claimed is:

1. A disc holding mechanism within a disc tray unit for positioning and holding a disc in place above a surface compressing an upper face of the disc tray unit, the disk holding mechanism comprising:

a plurality of holding pins operative to selectively hold a disc by a central hole of the disc, the plurality of holding pins comprising at least one stationary pin and at least one movable pin;

means operative for loading the disc tray unit with a disc, for moving the at least one movable pin in a radially outward direction relative to the central hole of the disc and further into the central hole of the disc above the surface of the disc tray unit to secure said disc in a holding state by spacing apart the at least one movable pin relative to the at least one stationary pin for engagement of said plurality of holding pins against a peripheral surface of said central hole; and means operative for unloading the disc tray unit, for moving the at least one movable pin in a radially inward direction relative to the central hole of the disc and withdrawing the movable pin out of said central hole to release the disc from its holding state.

2. The disc holding mechanism according to claim 1, wherein the presence or absence of the disc is detected according to a position of the movable pin when the disc tray unit is loaded.

* * * * *

UNITED STATES PATENT AND TRADEMARK OFFICE
CERTIFICATE OF CORRECTION

Figure 6:
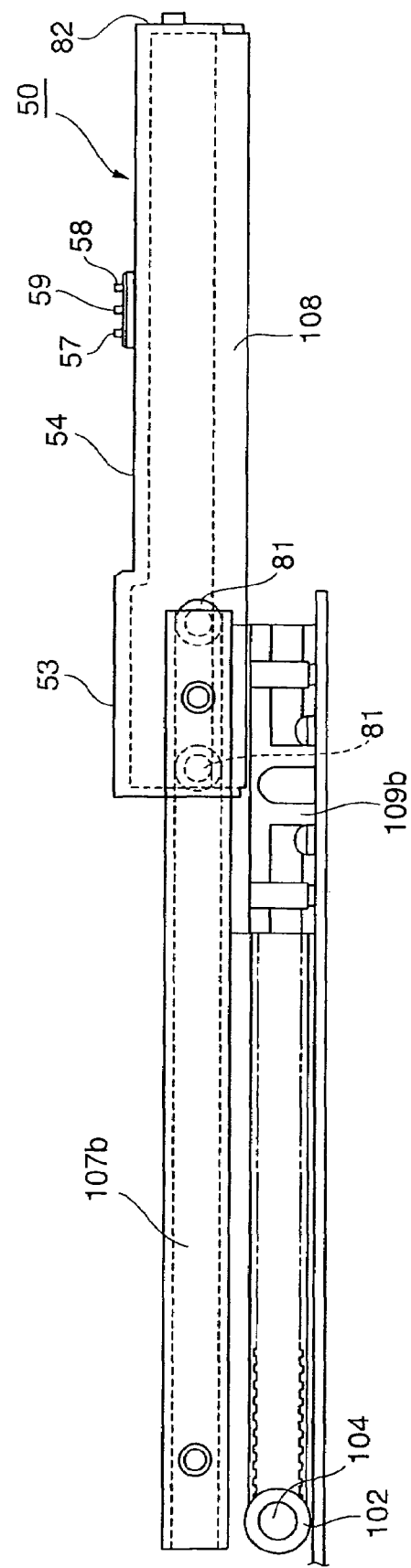
FIG. 6 is a side view showing the construction of the essential parts of the disc tray unit carrying mechanism.
Figure 7:
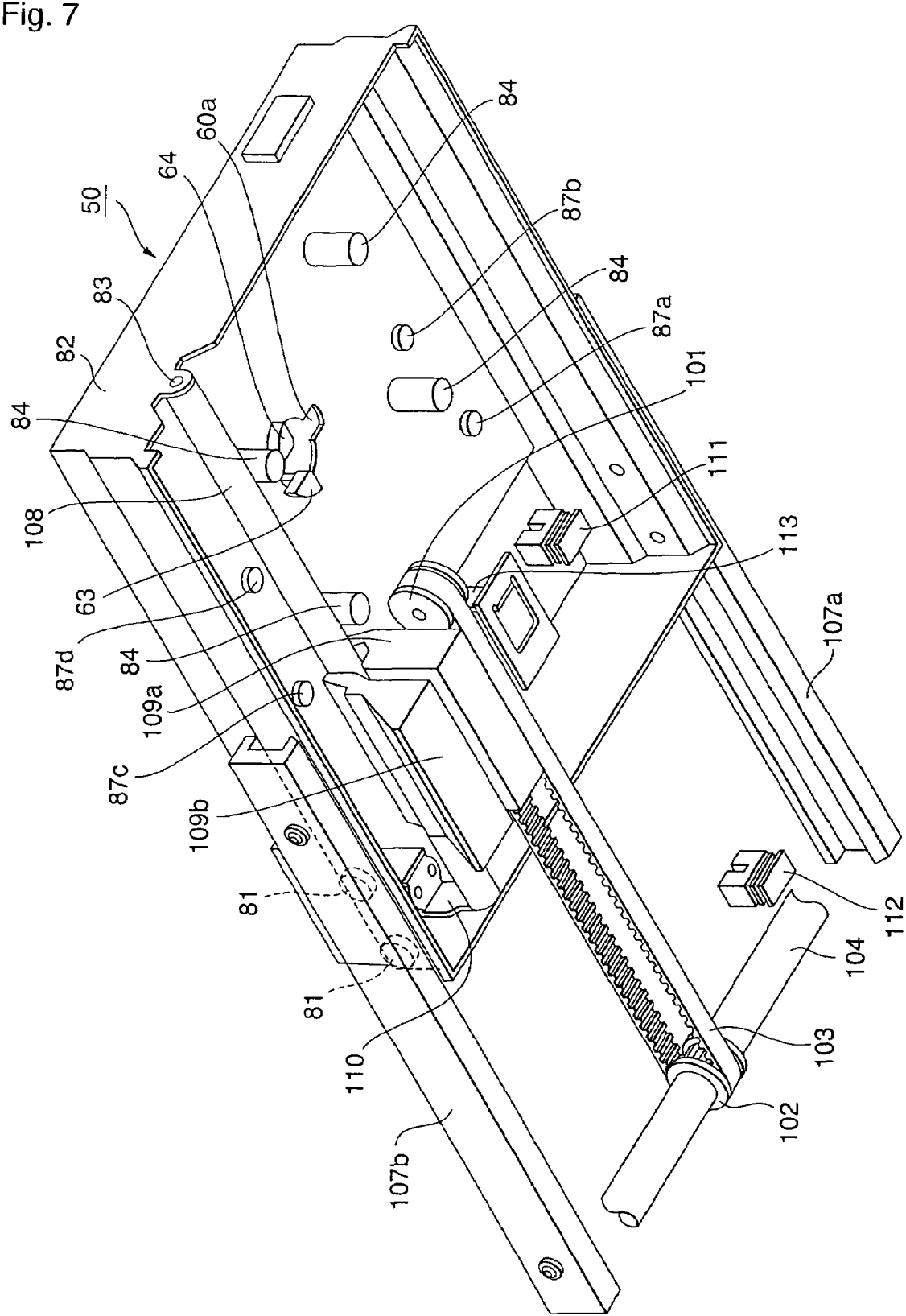
FIG. 7 is a lower perspective view showing the construction of the essential parts of the disc tray unit carrying mechanism.
Figure 8:
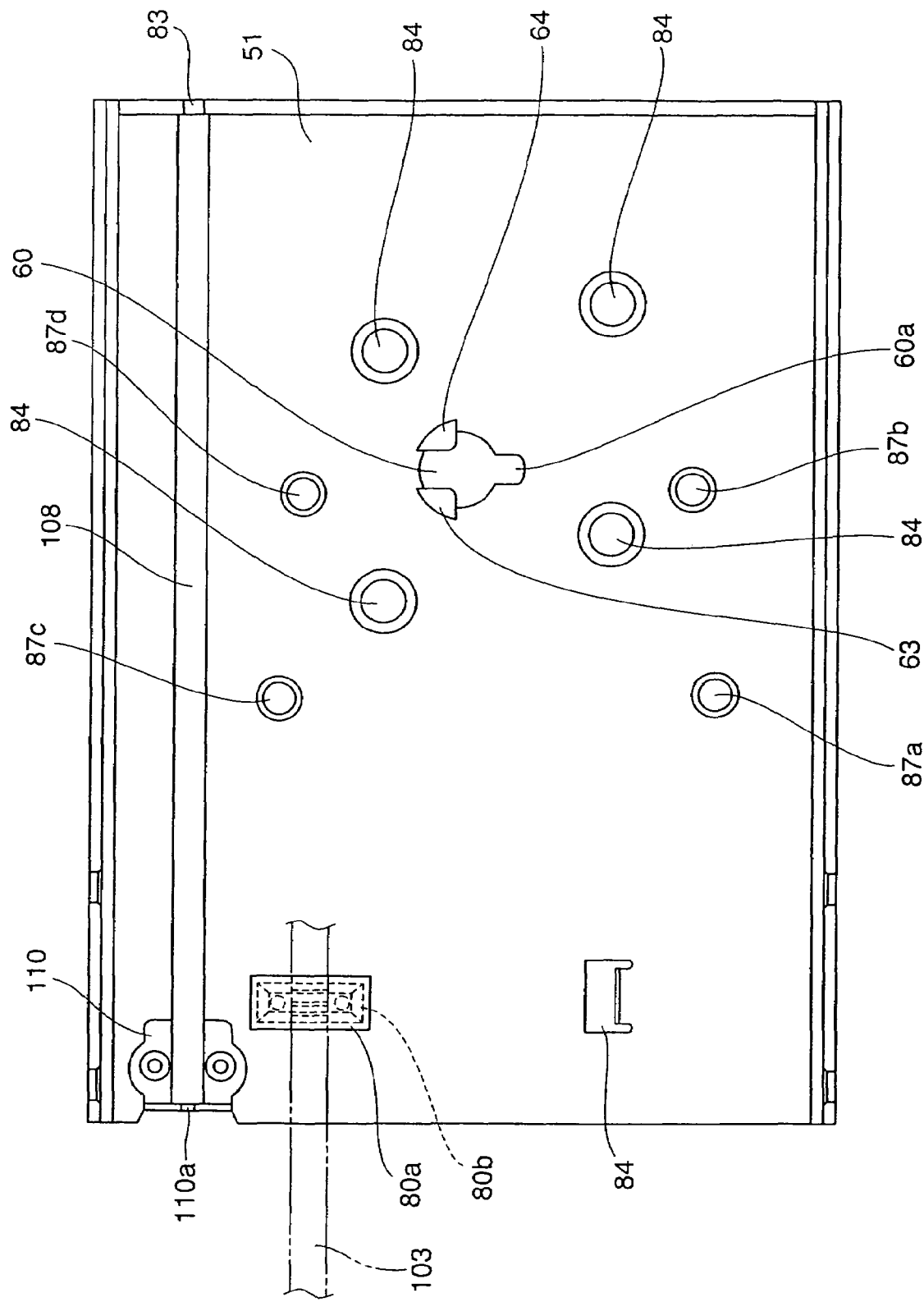
FIG. 8 is a bottom plan view of a tray body.

PATENT NO. : 7,360,225 B2
APPLICATION NO. : 10/955010
DATED : April 15, 2008
INVENTOR(S) : Tatsuo Shiaku It is certified that error appears in the above-identified patent and that said Letters Patent is hereby corrected as shown below:

Column 1, line 17, "compacts" should read --compact--;

Column 1, line 21, "inks" should read --ink--;

Column 1, line 51, "an" should read --a--;

Column 3, line 32, "damper" should read --clamper--;

Column 3, line 43, "the whether the" should read --whether the--;

Column 6, line 48, "FIG. 7" should read --FIG. 6--;

Column 6, line 48, "FIG. 8" should read --FIG. 7--;

Column 6, line 49, "a back view" should read --a bottom plan view--;

Column 10, line 12, "the only" should read --only--; and

Column 14, line 39, "out them" should read --them out--.

Signed and Sealed this

First Day of December, 2009

David J. Kappos
*Director of the United States Patent and Trademark Office*